US012567295B2

(12) United States Patent
Gorkovenko et al.

(10) Patent No.: US 12,567,295 B2
(45) Date of Patent: Mar. 3, 2026

(54) ELECTRONIC LOCK WITH FACIAL AUTHENTICATION FEATURES

(71) Applicant: ASSA ABLOY Americas Residential Inc., New Haven, CT (US)

(72) Inventors: Elena Gorkovenko, Mission Viejo, CA (US); Matthew Denton Lovett, Lake Forest, CA (US); Mark Bloom, Ladera Ranch, CA (US); Ali Atash, Irvine, CA (US); Donnie Viajar, Santa Margarita, CA (US); Matthew Zimmer, Mission Viejo, CA (US); Elliott Schneider, Foothill Ranch, CA (US); Subramanian Muthu, Middleton, WI (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 70 days.

(21) Appl. No.: 18/149,395

(22) Filed: Jan. 3, 2023

(65) Prior Publication Data

US 2023/0215232 A1     Jul. 6, 2023

Related U.S. Application Data

(60) Provisional application No. 63/296,094, filed on Jan. 3, 2022.

(51) Int. Cl.
    *G07C 9/00*        (2020.01)
    *E05B 47/00*      (2006.01)
    (Continued)

(52) U.S. Cl.
    CPC ......... *G07C 9/00563* (2013.01); *G06V 20/52* (2022.01); *G06V 40/172* (2022.01);
    (Continued)

(58) Field of Classification Search
    CPC ............ G07C 9/00563; G07C 9/00309; G07C 9/00571; G07C 9/0065; G07C 9/02;
    (Continued)

(56) References Cited

U.S. PATENT DOCUMENTS

| | | | | |
|---|---|---|---|---|
| 7,310,043 B2 * | 12/2007 | Mamaloukas | ..... | G07C 9/00309 |
| | | | | 340/5.23 |
| 7,847,675 B1 * | 12/2010 | Thyen | ................ | G07C 9/00896 |
| | | | | 340/5.31 |

(Continued)

FOREIGN PATENT DOCUMENTS

| | | | | | |
|---|---|---|---|---|---|
| EP | 2542744 B1 * | 7/2015 | ......... | G07C 9/00087 |
| JP | 4365189 B2 * | 11/2009 | ......... | G07C 9/00158 |

(Continued)

OTHER PUBLICATIONS

Burt, Chris, "Intel launches edge biometric facial authentication solution for integration with numerous devices", biometric update. com, Jan. 6, 2021, 5 pages.

(Continued)

*Primary Examiner* — Steven A Tullia
(74) *Attorney, Agent, or Firm* — Merchant & Gould P.C.

(57) ABSTRACT

An electronic lock includes an interior subassembly including a manual turnpiece, a control circuit, and a motor actuatable by the control circuit, and an exterior subassembly including a facial authentication circuit operatively connected to the control circuit. The electronic lock includes a latch operatively connected to the interior subassembly, the latch being engageable by the manual turnpiece or the motor to move the electronic lock between a locked state and an unlocked state. The facial authentication circuit includes at least one camera and is configured to generate an authentication signal to the control circuit, and wherein, at least in part in response to the authentication signal, the control circuit is configured to actuate the motor to move the (Continued)

electronic lock between the locked state and the unlocked state.

22 Claims, 20 Drawing Sheets

(51) Int. Cl.

| | |
|---|---|
| *E05B 63/00* | (2006.01) |
| *G06V 20/52* | (2022.01) |
| *G06V 40/16* | (2022.01) |
| *H04N 5/77* | (2006.01) |

(52) U.S. Cl.

CPC ..... *G07C 9/00309* (2013.01); *G07C 9/00571* (2013.01); *H04N 5/77* (2013.01); *E05B 47/0001* (2013.01); *E05B 2047/0058* (2013.01); *E05B 2047/0095* (2013.01); *E05B 63/0017* (2013.01); *G07C 2009/00642* (2013.01); *G07C 2209/02* (2013.01)

(58) Field of Classification Search

CPC ......... G07C 2009/00642; G06V 20/52; G06V 40/172; H04N 5/77; E05B 47/0001; E05B 63/0017; E05B 2047/0058; E05B 2047/0095; E05B 2047/0059; E05B 2047/0097

USPC .......................................................... 70/278.1

See application file for complete search history.

(56) References Cited

U.S. PATENT DOCUMENTS

| | | | | |
|---|---|---|---|---|
| 8,222,990 | B2 * | 7/2012 | Gerner | G07C 9/00309 |
| | | | | 340/5.2 |
| 8,274,365 | B2 * | 9/2012 | Piccirillo | E05B 67/00 |
| | | | | 340/5.74 |
| 8,423,785 | B2 * | 4/2013 | Takikawa | G06V 40/16 |
| | | | | 726/17 |
| 9,574,375 | B2 * | 2/2017 | Henderson | G07C 9/0069 |
| 9,621,702 | B2 * | 4/2017 | Shen | H04M 1/72415 |
| 9,673,868 | B2 * | 6/2017 | Curtis | G07C 9/00174 |
| 9,754,094 | B2 * | 9/2017 | Fujiwara | G06V 40/168 |
| 10,037,636 | B2 * | 7/2018 | Ho | G07C 9/00896 |
| 10,043,332 | B2 * | 8/2018 | Scalisi | H04N 7/186 |
| 10,074,224 | B2 * | 9/2018 | Ho | G07C 9/00309 |
| 10,127,750 | B2 * | 11/2018 | Cordiner | G07C 9/27 |
| 10,235,822 | B2 * | 3/2019 | Nye | G05B 15/02 |
| 10,246,905 | B2 * | 4/2019 | Al-Kahwati | E05B 47/0004 |
| 10,389,983 | B1 * | 8/2019 | Fu | H04N 7/181 |
| 10,395,128 | B2 * | 8/2019 | Van Os | G06V 10/17 |
| 10,410,076 | B2 * | 9/2019 | Van Os | G06V 10/242 |
| 10,521,579 | B2 * | 12/2019 | Van Os | H04L 9/3231 |
| 10,643,412 | B1 * | 5/2020 | Yang | H04N 7/183 |
| 10,666,913 | B1 * | 5/2020 | Siminoff | H04N 7/186 |
| 10,783,227 | B2 * | 9/2020 | Van Os | G06F 3/04883 |
| 10,815,695 | B2 * | 10/2020 | Shaffer | G07C 9/00309 |
| 10,985,909 | B2 * | 4/2021 | Bolotin | H04L 9/0894 |
| 11,244,524 | B2 * | 2/2022 | Ho | G07C 9/00571 |
| 11,263,844 | B2 * | 3/2022 | Gant | E05B 47/0001 |
| 11,335,148 | B2 * | 5/2022 | Kelley | G07C 9/00182 |
| 11,386,189 | B2 * | 7/2022 | Van Os | G06F 3/016 |
| 11,403,902 | B2 * | 8/2022 | Ho | H04L 65/1069 |
| 11,555,331 | B2 * | 1/2023 | Johns | E05B 47/026 |
| 11,616,654 | B2 * | 3/2023 | Hart | H04L 9/3268 |
| | | | | 713/156 |
| 11,727,740 | B1 * | 8/2023 | Bodurka | G07C 9/00571 |
| | | | | 340/5.7 |
| 11,765,163 | B2 * | 9/2023 | Van Os | H04N 23/611 |
| | | | | 340/5.83 |
| 11,790,743 | B2 * | 10/2023 | Subramany | G06V 20/52 |
| | | | | 340/541 |
| 11,869,295 | B2 * | 1/2024 | Imanuel | H04L 63/0442 |
| 11,993,953 | B2 * | 5/2024 | Shaffer | G07C 9/00309 |
| 2004/0037450 | A1 * | 2/2004 | Bradski | G06V 40/161 |
| | | | | 382/103 |
| 2008/0061927 | A1 * | 3/2008 | Manton | G07C 9/00563 |
| | | | | 340/5.7 |
| 2011/0025459 | A1 * | 2/2011 | Denison | G07F 7/1008 |
| | | | | 340/5.51 |
| 2011/0091080 | A1 * | 4/2011 | Gamliel | G06V 40/164 |
| | | | | 382/118 |
| 2014/0077929 | A1 * | 3/2014 | Dumas | G07C 9/00571 |
| | | | | 340/5.61 |
| 2016/0275739 | A1 | 9/2016 | Scalisi | |
| 2017/0098335 | A1 | 4/2017 | Payack, Jr. | |
| 2018/0061164 | A1 | 3/2018 | Scalisi et al. | |
| 2018/0108192 | A1 * | 4/2018 | Ho | G07C 9/253 |
| 2019/0272691 | A1 | 9/2019 | Nye | |
| 2020/0219345 | A1 * | 7/2020 | Beck | G07C 9/00174 |
| 2022/0233010 | A1 * | 7/2022 | Sundaresan | A47G 29/141 |
| 2022/0342972 | A1 * | 10/2022 | Van Os | G06V 40/172 |
| 2022/0406113 | A1 * | 12/2022 | Imanuel | G07C 9/00309 |
| 2023/0056890 | A1 | 2/2023 | Pasma et al. | |
| 2023/0193660 | A1 * | 6/2023 | Lin | E05B 49/00 |
| | | | | 70/279.1 |
| 2023/0363562 | A1 * | 11/2023 | O'Toole | A61L 2/26 |

FOREIGN PATENT DOCUMENTS

| | | | | | |
|---|---|---|---|---|---|
| JP | | 2022003545 | A | * | 1/2022 | G06F 18/00 |
| KR | | 20180088554 | A | * | 8/2018 | G07C 9/00071 |
| KR | | 20200048418 | A | * | 5/2020 | G07C 9/00658 |
| KR | | 20200107670 | A | * | 9/2020 | E05B 47/0012 |
| KR | | 20200136504 | A | * | 12/2020 | H04L 9/3231 |
| KR | 10-2021-0029953 | A | | 3/2021 | |
| TW | | I723858 | B | * | 4/2021 | G06V 40/50 |
| WO | WO-2019240669 | A1 | * | 12/2019 | G06F 21/62 |
| WO | WO-2022150704 | A1 | * | 7/2022 | E05B 47/06 |
| WO | WO-2024006540 | A1 | * | 1/2024 | E06B 7/2318 |

OTHER PUBLICATIONS

International Search Report and Written Opinion for Application No. PCT/US2022/082647 mailed May 17, 2023.

\* cited by examiner

User ID
Database
612

| Slot | User ID | Facial Auth. Profile | Privileges |
|------|---------|----------------------|------------|
| A | Admin | 2asdf5998 | Anytime |
| B | User B | 25asdf6f8 | M: 7am-8am |
| ... | ... | ... | ... |
| ... | ... | ... | ... |
| N | User N | ... | ... |

1400

1600

Detect object using electronic lock exterior
hardware
1602

Adjust electronic lock in response to the
detected object
1604

1800

1900

Authentication Result
1902

Authorized User Confidence Score: 78%
Person Confidence Score: 93%

2000

Initiate user enrollment at a user device
2002

Receive facial authentication data at the user device
2004

Send facial authentication data to the electronic lock to complete user enrollment
2006

ELECTRONIC LOCK WITH FACIAL AUTHENTICATION FEATURES

CROSS-REFERENCE TO RELATED APPLICATION

This application claims the benefit of U.S. Provisional Application Ser. No. 63/296,094, filed Jan. 3, 2022, the disclosure of which is hereby incorporated by reference in its entirety.

TECHNICAL FIELD

This invention relates to the field of electronic locks. More particularly, the intention relates to an electronic lock with facial authentication features.

BACKGROUND

Electronic locks have gained increasing acceptance and widespread use in residential and commercial markets due to the many benefits they provide. One example benefit may include the ability to lock or unlock a door with the use of a mobile device, such as a smartphone or tablet. Another example benefit may include using a programmed code or a biometric input, such as a fingerprint or retina scan to lock or unlock a door. Such benefits are not only useful for the owner or tenant of the premises where the electronic lock is installed, but can also be useful for allowing guest users to lock and unlock the door with their mobile devices, programmed code, or biological characteristics, rather than furnishing guest users with a physical key. For example, a guest user may be an individual whom the owner wishes to grant access to perform permitted actions (e.g., lock, unlock, add a lock actuation passcode) associated with the electronic lock, oftentimes for a temporary time period.

Electronic deadbolts are controlled by an administrative user. The administrative user has the ability to determine and control authorized and unauthorized users, and therefore determine who is able to unlock the deadbolt.

Additionally, electronic deadbolts and doorbells are increasingly available with a wide variety of enhanced features, such as video cameras that may capture activity outside a front door of a home or apartment complex. In such instances, additional difficulties with respect to management of images captured of subjectivity are introduced. Furthermore, image data that is captured at an electronic deadbolt may have a variety of uses that can enhance the operation of the electronic deadbolt.

SUMMARY

Some embodiments of the present disclosure relate generally to systems and methods for an electronic lock with facial authentication features. In typical embodiments, the facial authentication process is performed on the electronic lock. Some embodiments of the present disclosure relate to systems and methods for an electronic lock with a camera.

In an example aspect, an electronic lock includes an interior subassembly including a manual turnpiece, a control circuit, and a motor actuable by the control circuit, and an exterior subassembly including a facial authentication circuit operatively connected to the control circuit. The electronic lock includes a latch operatively connected to the interior subassembly, the latch being operable by the manual turnpiece or the motor to move the electronic lock between a locked state and an unlocked state. The facial authentication circuit includes at least one camera and is configured to generate an authentication signal to the control circuit, and wherein, at least in part in response to the authentication signal, the control circuit is configured to actuate the motor to move the electronic lock between the locked state and the unlocked state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
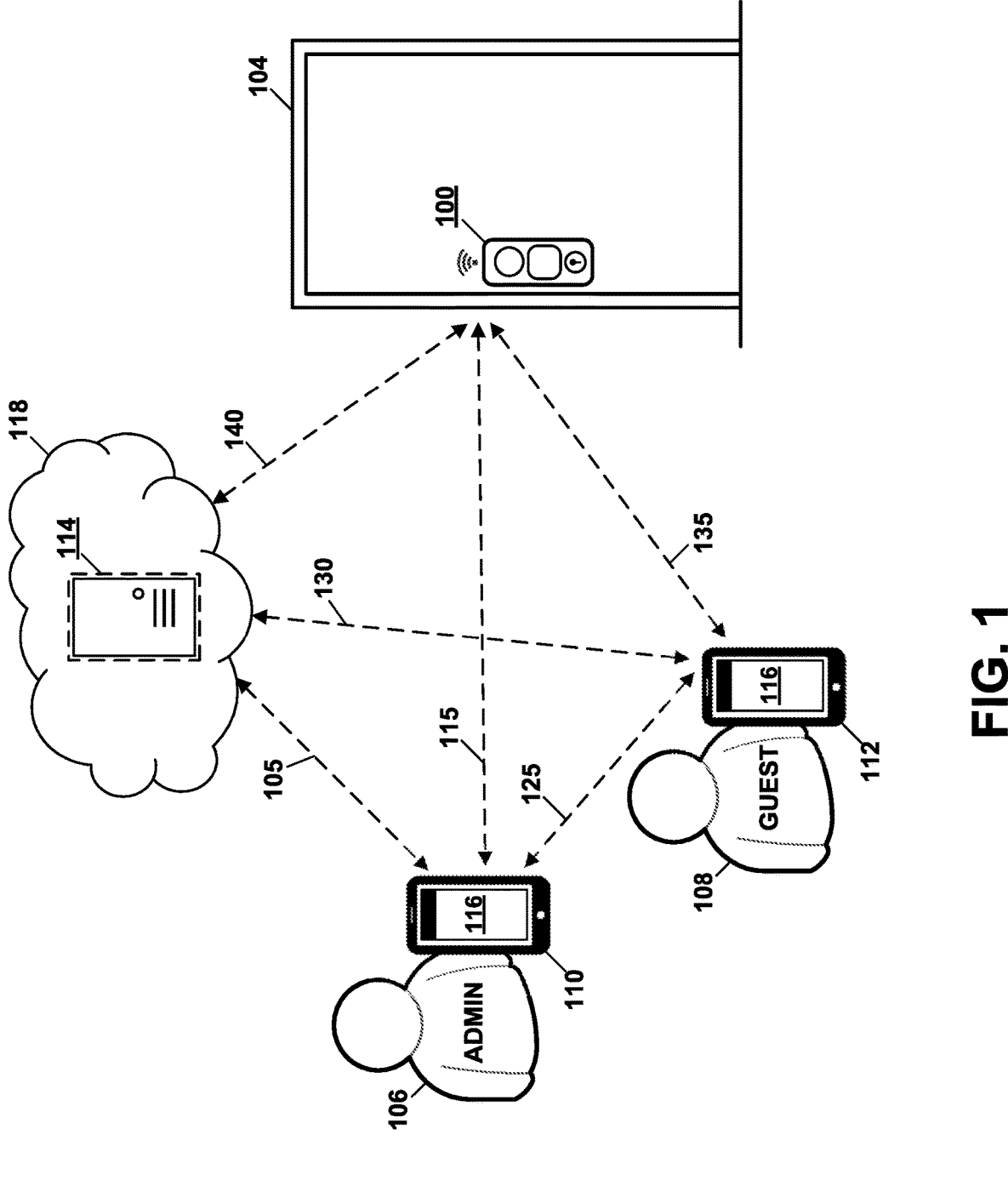
FIG. 1 is a block diagram of an example environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Some embodiments of the present invention are directed to an electronic lock (sometimes referred to as an electronic lock or electronic lockset) with facial authentication features. Some embodiments of the present disclosure relate to systems and methods for an electronic lock with a camera.

In some example aspects, various wireless protocols can be used. In example embodiments, a Wi-Fi protocol (802.11x) may be used to connect the electronic lock to a server (cloud) device, while a different wireless protocol (e.g., BLUETOOTH®, including BLUETOOTH® Low Energy, or BLE) may be used for short-range communication between the electronic lock and other devices, such as a mobile device used to actuate the lock. In other embodiments, various other wireless protocols can be used, such as other short- or long-range wireless protocols (e.g., cellular, RFID/NFC, Zigbee®, Z-wave®, etc.). In other example aspects, locks operate as an individual system without wireless communication.

The term "lock" or "lockset" is broadly intended to include any type of lock, including but not limited to, deadbolts, knob locks, lever handle locks, mortise locks, and slide locks, whether electrical, or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to, deadbolts, knob-set locks, handle-set locks, etc. Still further, example aspects of the present application can be applied to other types of IoT devices for which security is an issue, e.g., wireless/interconnected home devices that store user data.

FIG. 1 illustrates an operating environment 102 in which aspects of the present disclosure may be implemented. As shown, the operating environment 102 includes a door 104 comprising an electronic lock 100 (also referred to as a wireless electronic lockset) installed at a premises. The electronic lock 100 may be operative or configured to lock and unlock the door 104 using facial authentication technology. In some embodiments, the electronic lock is operative or configured to lock and unlock the door 104 based on a programmed code, other biometric, or via a client application 116 (e.g., an electronic lock application) operating on a user computing device (e.g., an admin mobile device 110, a guest mobile device 112).

An administrative user 106 of the electronic lock 100 is a master user or authorized person, such as an owner or tenant of the premises where the door 104 comprising the electronic lock 100 is installed. The administrative user 106 has a mobile computing device (herein referred to as admin mobile device 110), such as a smartphone or tablet with wireless communication capabilities. The admin mobile device 110 is capable of communicating 105 with a server 114, communicating 115 with the electronic lock 100, and communicating 125 with a mobile phone or other mobile computing device of a guest user 108 (herein referred to as guest mobile device 112). For example, the admin mobile device 110 may be operative or configured to communicate wirelessly with the server 114, the electronic lock 100, and the guest mobile device 112 using one or more wireless protocols.

The guest user 108 may be a person whom the administrative user 106 may wish to grant access to perform at least a subset of actions (e.g., lock, unlock, change some settings) associated with the electronic lock 100. For example, the guest user 108 may be a short-time user of the electronic lock 100, such as a vacation rental user of the premises, a pet sitter, a cleaning person, etc. In other examples, the guest user 108 may be a long-term user of the electronic lock, such as another user within the household, a renter, or sublease tenant. In some examples, the administrative user 106 may wish to allow the guest user 108 to enroll as a user of the electronic lock 100 for enabling the guest user 108 to perform lock actions. In some examples, the electronic lock 100 may be configured to enter into a secure enrollment mode, which may allow the guest user 108 to register a passcode (e.g., numeric, alphanumeric, a biometric characteristic (e.g., facial authentication calibration), etc.) with the electronic lock 100 that enables the guest user 108 to actuate the electronic lock 100. For example, a guest user 108 enrolling at the electronic lock may perform steps to create a facial authentication profile that enables the guest user 108 to actuate the electronic lock 100. In other examples, when in the secure enrollment mode, the electronic lock 100 may be enabled to pair with the guest mobile device 112, which may allow the guest user 108 to actuate the electronic lock 100 via the client application 116 operating on the guest mobile device 112. The gust mobile device 112 is capable of communicating 135 with the electronic lock 100.

In typical embodiments, the facial authentication process is performed on the electronic lock 100. Advantages of performing facial authentication on the electronic lock 100 include improved facial authentication data security.

The server 114 may be a physical server or a virtual server hosted in a cloud storage environment 118. In some examples, the electronic lock 100 is operative or configured to communicate 140 with the server 114. Such communication 140 can optionally occur via one or more wireless communication protocols, e.g., WIFI (IEEE 802.11), short-range wireless communication to a WIFI bridge, or other connection mechanism. The server 114 may be operative or configured to expose one or more application programming interfaces (APIs) that may be used for communications between the admin mobile device 110 and server 114 (communication 105), between the guest mobile device 112 and the server 114 (communication 130), and between the server 114 and the electronic lock 100. In some examples, the server 114 may be operative or configured to generally manage user accounts (e.g., the admin user account and guest user accounts) associated with the electronic lock 100 and to relay instructions between authorized mobile devices and the electronic lock 100.

In some examples, as part of the enrollment code verification process that may be performed to ensure that the intended guest user 108 is authorized to enroll as a user of the electronic lock 100, the server 114 may be operative or configured with a list of trusted users. In some examples, an administrative user 106 uploads an image for one or more users on the list of trusted users. The trusted list of users is downloaded at the electronic lock 100. The electronic lock 100 creates a profile for the users which includes facial characteristics detected in the images and stores the profiles. In these examples, the user facial profile is updated the first time a user is authenticated at the electronic lock. When a user from the list of trusted users is present at the lock, the lock is able to link the user with the user's profile based on facial characteristics detected at the lock. Additional enrollment procedures may be performed after or before linking the user with their profile from the list of trusted users. For example, as part of the enrollment code verification process that may be performed to ensure that the intended guest user 108 is authorized to enroll as a user of the electronic lock 100, the server 114 may be operative or configured to provide the unique enrollment code to the electronic lock 100. As will be described in further detail below, the electronic lock 100 may be operative or configured to present (e.g., visually, audibly, tactically) the unique enrollment code, which may be captured by a sensor included in the guest mobile device 112. For example, the unique enrollment code may be verified by the client application 116 operating on the guest mobile device 112 or communicated to the server 114 for verification. Upon verification of the unique enrollment code, the electronic lock 100 may be instructed to enter into the secure enrollment mode.

In other example implementations, the unique enrollment code may be presented (e.g., visually, audibly, tactically) by the guest mobile device 112, captured by a sensor included in the electronic lock 100, and verified by the electronic lock 100 or by the server 114. For example, the enrollment code may be encoded in a machine readable code (e.g., a QR code) which is displayed on the guest mobile device 112. A user can hold the screen up to a camera on the electronic lock 100 which is able to scan and decode the machine readable code to verify the unique enrollment code.

Figure 2:
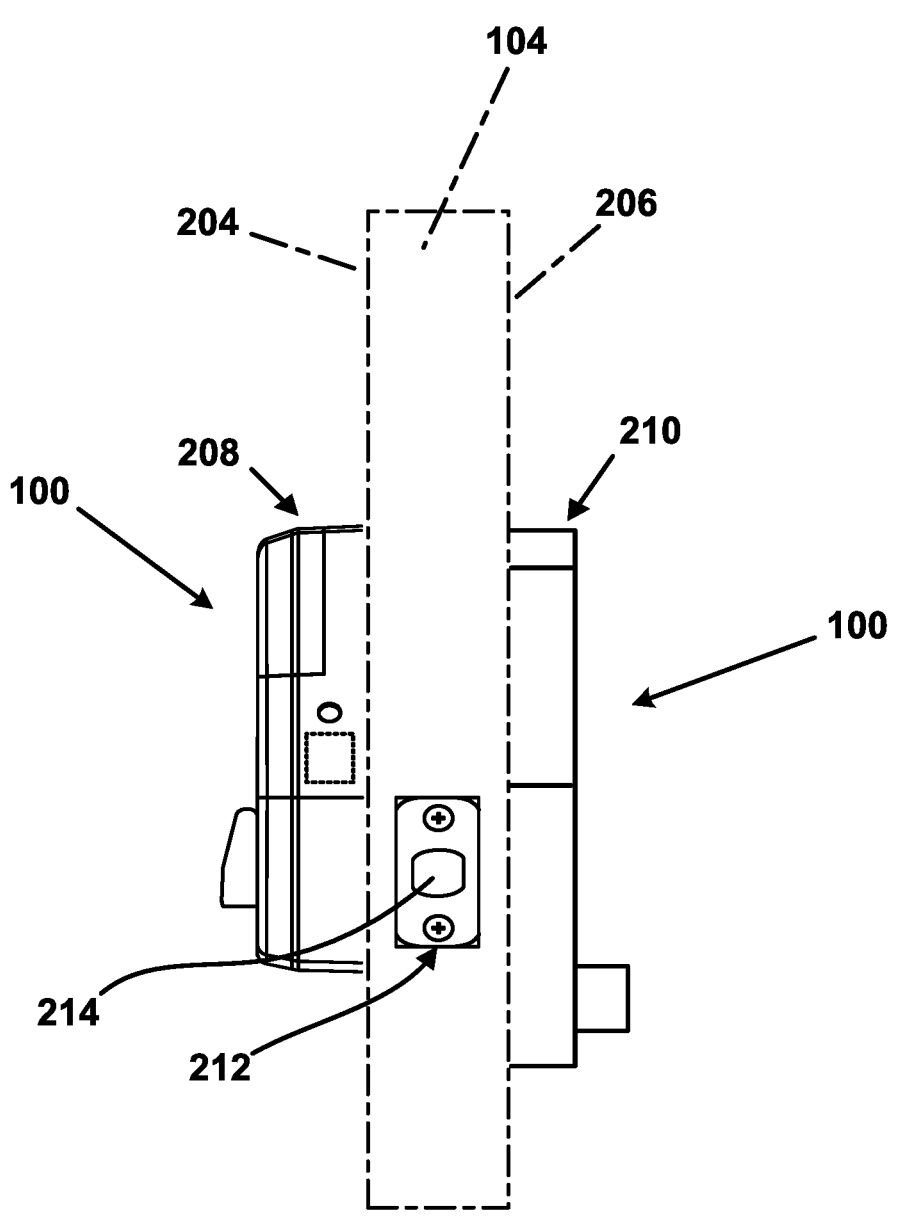
FIG. 2 is an illustration of a side view of a portion of the electronic lock with facial authentication features seen in the example environment of FIG. 1.
Figure 3:
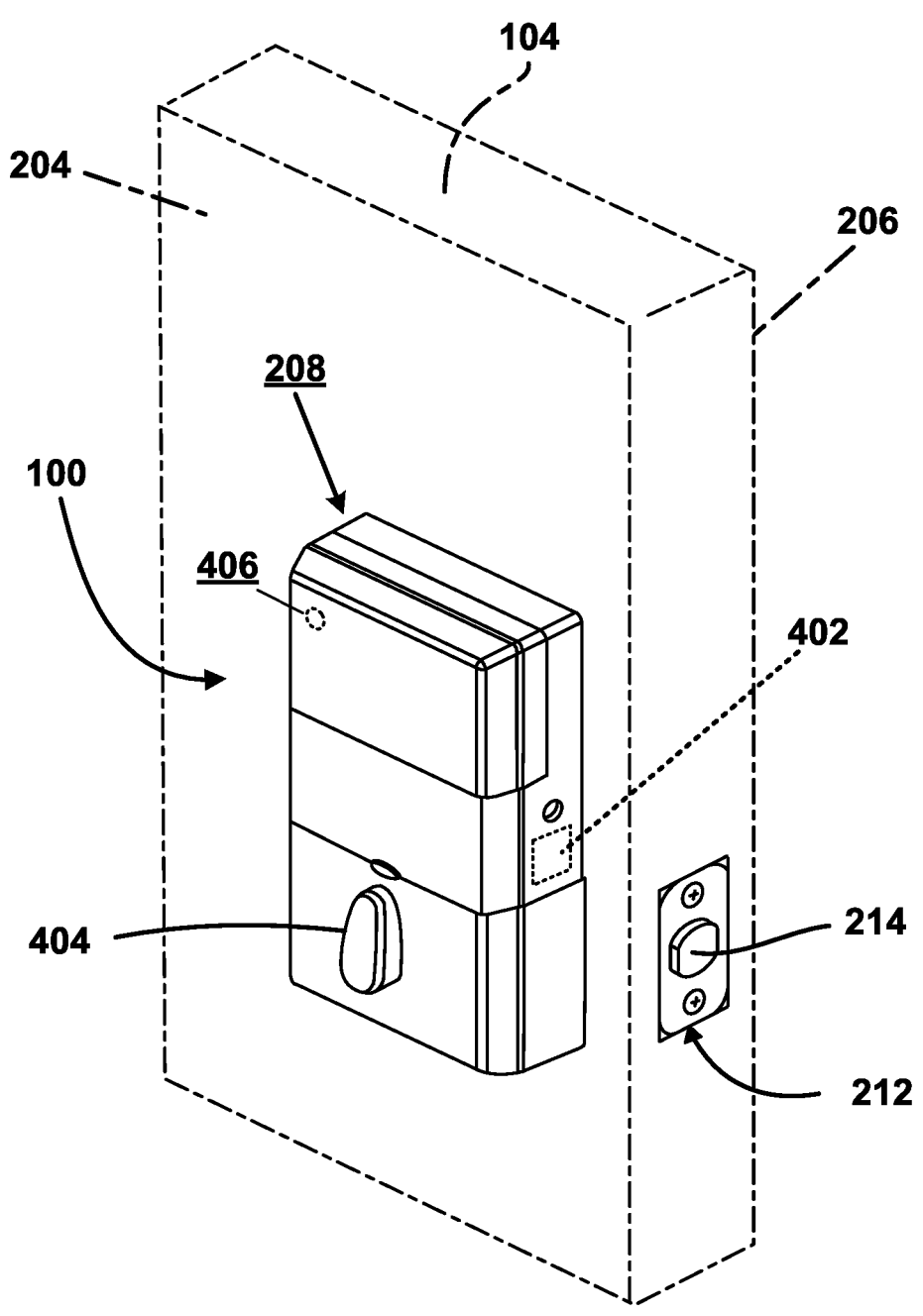
FIG. 3 is an illustration of a rear perspective view of a portion of the electronic lock with facial authentication features seen in the example environment of FIG. 1.
Figure 4:
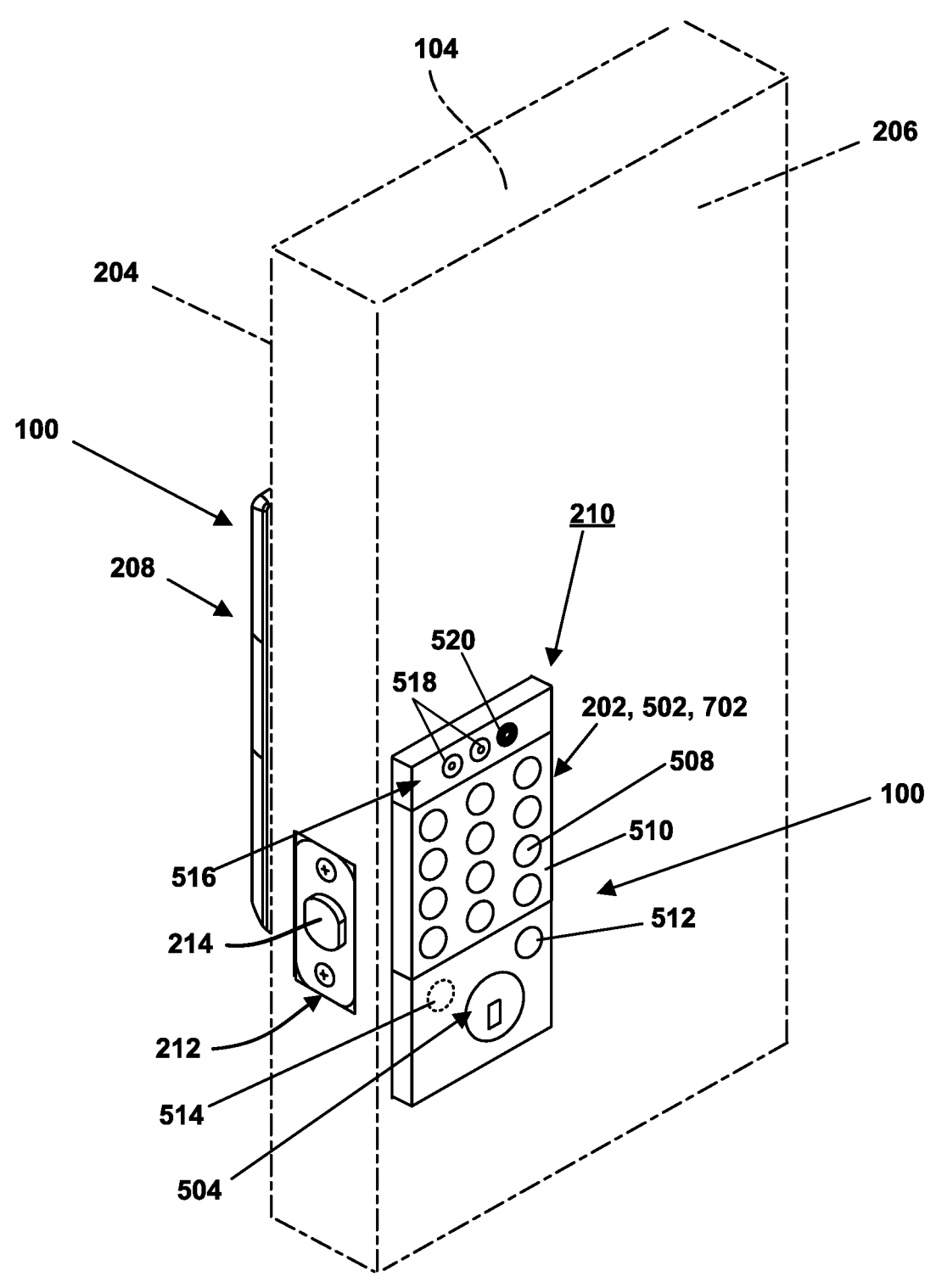
FIG. 4 is an illustration of a front perspective view of a portion of the electronic lock with facial authentication features seen in the example environment of FIG. 1.

FIGS. 2-4 illustrate an electronic lock 100 as installed at a door 104, according to one example of the present disclosure. With reference now to FIG. 2, as shown, the door 104 has an interior side 204 and an exterior side 206. The electronic lock 100 may include an interior assembly 208, an exterior assembly 210, and a latch assembly 212. The latch assembly 212 is shown to include a bolt 214 that is movable between an extended position (locked) and a retracted position (unlocked, shown in FIGS. 2-4). Specifically, the bolt 214 is configured to slide longitudinally and, when the bolt 214 is retracted, the door 104 is in an unlocked state. When the bolt 214 is extended, the bolt 214 may protrude from the door 104 into a doorjamb (not shown) to place the door in a locked state.

In some examples, the interior assembly 208 is mounted to the interior side 204 of the door 104, and the exterior assembly 210 is mounted to the exterior side 206 of the door 104. The latch assembly 212 is typically at least partially mounted in a bore formed in the door 104. The term "outside" is broadly used to mean an area outside the door 104 and "inside" is broadly used to denote an area inside the door 104. With an exterior entry door, for example, the exterior assembly 210 may be mounted outside a building, while the interior assembly 208 may be mounted inside a building. With an interior door, the exterior assembly 210 may be mounted inside a building, but outside a room secured by the electronic lock 100, and the interior assembly

208 may be mounted inside the secured room. The electronic lock 100 is applicable to both interior and exterior doors.

Referring to FIG. 3, the interior assembly 208 can include a processing unit 402 (shown schematically) containing electronic circuitry for the electronic lock 100. In some examples, the interior assembly 208 includes a manual turnpiece 404 that can be used on the interior side 204 of door 104 to move the bolt 214 between the extended and retracted positions. The processing unit 402 is operable to execute a plurality of software instructions (i.e., firmware) that, when executed, cause the electronic lock 100 to implement the methods and otherwise operate and have functionality as described herein. The processing unit 402 may comprise a device commonly referred to as a processor, e.g., a central processing unit (CPU), digital signal processor (DSP), or other similar device, and may be embodied as a standalone unit or as a device shared with components of the electronic lock 100. The processing unit 402 may include memory communicatively interfaced to the processor, for storing the software instructions. Alternatively, the electronic lock 100 may further comprise a separate memory device for storing the software instructions that is electrically connected to the processing unit 402 for the bi-directional communication of the instructions, data, and signals therebetween.

In some examples, the processing unit 402 operates to perform facial authentication using a facial authentication model stored on the separate memory device. The processing unit 402 is operated to receive facial authenticating data, received from one or more sensors on the exterior assembly. The facial authentication model receives the facial authentication data and compares the features detected in the data with the features in a stored user facial authentication profile (e.g., stored facial authentication data facial characteristic data) to identify the user. The processor further allows the user to actuate the lock based on the permissions for the identified user.

In some examples, the facial authentication model is further trained on the electronic lock. In other examples, the model is pretrained on a separate computing system with a large set of facial authentication data and provided to the lock. In some examples, the model continues to adapt as various users use the facial authentication features on the lock. For example, the model may be trained on specific users and operate to learn to authenticate the user even when the user has changing features. For example, the model may operate to authenticate the user with different levels of facial hair or when the user is wearing a hat, glasses, or mask. In some examples, the electronic lock stores a plurality of facial authentication methods based on different users, different conditions, etc. In some examples, the model is optimized to require minimal storage space, memory, and/or processing power.

In some examples, the interior assembly 208 includes a pairing button 406 (shown schematically), which when actuated, may initiate the secure enrollment mode. For example, the secure enrollment mode may enable the electronic lock 100 to receive a lock actuation passcode to be registered with the electronic lock 100 or may enable the electronic lock 100 to communicate with a mobile device (e.g., guest mobile device 112) within short-range wireless communication range for enabling the mobile device to be paired with the electronic lock 100 and used to actuate the lock. One example method of a biometric enrollment with an electronic lock 100 is described in U.S. Pat. No. 11,501,579, titled "SYSTEM AND METHOD OF ENROLLING USERS OF A WIRELESS BIOMETRIC LOCKSET," which is hereby incorporated by reference in its entirety.

In some examples, initiating the secure enrollment mode via an actuation of the pairing button 406 may be limited to users who have access to the interior side 204 of the door 104. Accordingly, aspects of the present disclosure may be utilized to initiate the secure enrollment mode without requiring access to the pairing button 406 or the interior side 204 of the door 104. One example of initiating the secure enrollment mode without requiring access to the interior assembly 208 is described in U.S. patent application Ser. No. 17/820,341 filed on Aug. 17, 2021, titled "SECURE GUEST ENROLLMENT AT ELECTRONIC LOCK", which is hereby incorporated by reference in its entirety.

Figure 5:
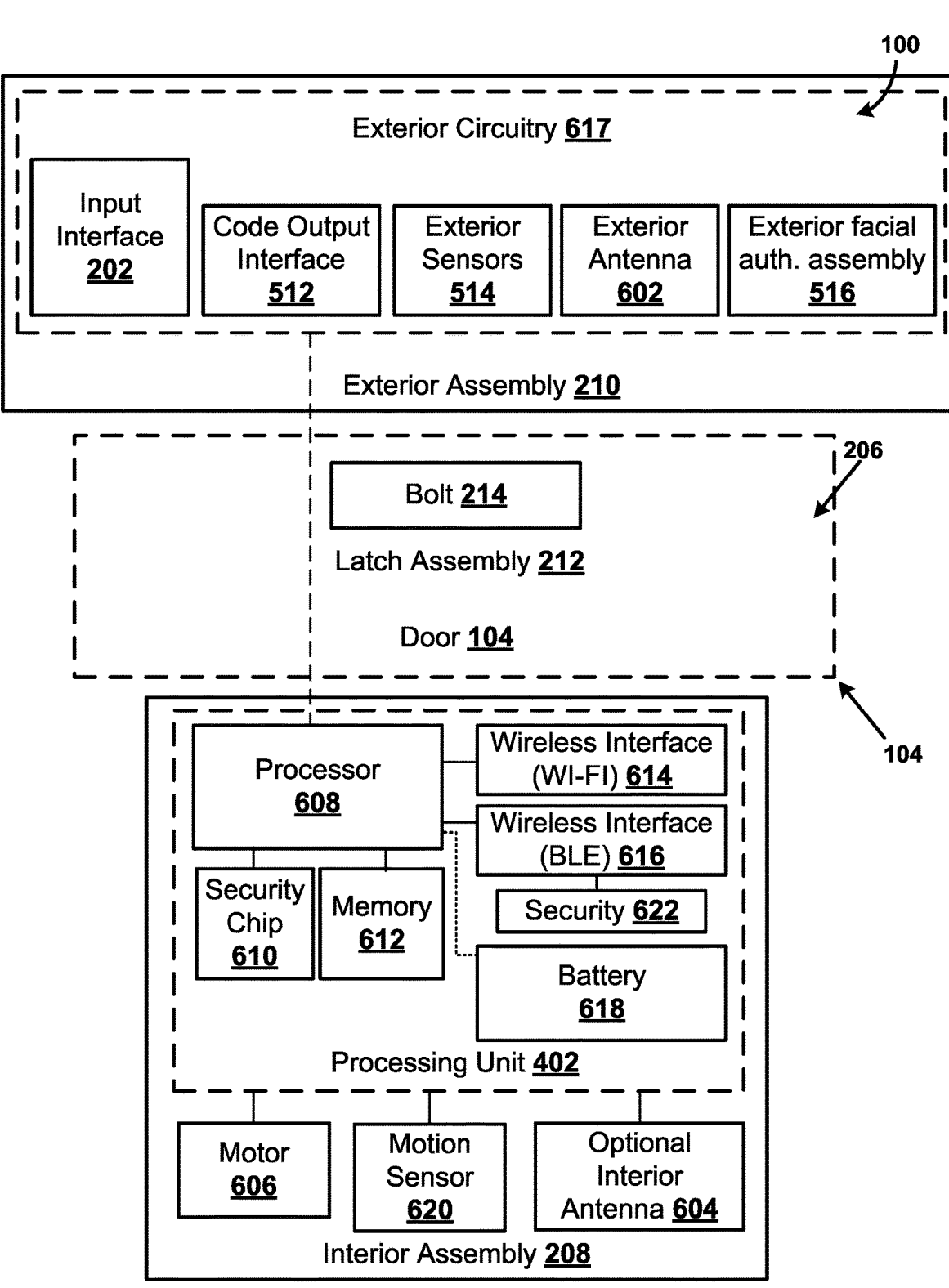
FIG. 5 is an illustration of a schematic view of the electronic lock with facial authentication features seen in the example environment of FIG. 1.

Referring to FIG. 4, the exterior assembly 210 can include exterior circuitry 617 communicatively and electrically connected to the processing unit 402. For example, the exterior assembly 210 can include an input interface 202. As shown in FIG. 5, in some examples, the input interface 202 may include a keypad 502 and/or buttons. For example, the keypad 502 and/or buttons may be operative or configured to receive a user input of an actuation passcode via a selection of a sequence of buttons or indicia (e.g., numeric, alphabetic, or alphanumeric) included in the keypad 502.

The keypad 502 may be any of a variety of different types of keypads. For example, the keypad 502 can include a plurality of buttons 508 that can be mechanically actuated by a user (e.g., physically pressed). In some examples, the keypad 502 includes a touch interface 510, such as a touch screen or a touch keypad, for receiving a user input. The touch interface 510 may be configured to detect a user's selection or "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

The exterior assembly 210 includes an exterior facial authentication assembly 516. The exterior facial authentication assembly 516 includes cameras 518 and a depth sensor 520. The exterior facial authentication assembly 516 is used to detect facial characteristics which act as an actuation passcode for the electronic lock. An example of the exterior facial authentication assembly is illustrated and described in reference to FIG. 6.

In some examples, the input interface 202 may include other biometric sensors, such as a fingerprint sensor, retina scanner, an audio interface by which voice recognition may be used to actuate the lock, or another type of sensor. For example, the biometric sensor may be operative or configured to receive a user input of an actuation passcode via sensing a biometric characteristic of a user.

When a user inputs a valid actuation passcode (e.g., successful facial authentication) into the input interface 202, the processor may operate to provide a lock actuation command to an electrical motor to move the bolt 214 between the extended and retracted positions. In some examples, the exterior assembly 210 is electrically connected to the interior assembly 208. Specifically, the input interface 202 may be electrically connected to the interior assembly 208, specifically to the processing unit 402, by, for example, an electrical cable (not shown) that passes through the door 104. When the user inputs a valid actuation passcode via the input interface 202 that is recognized by the processing unit 402, an electrical motor may be energized to retract the bolt 214 of the latch assembly 212, thus permitting the door 104 to be opened from a closed position. In some examples, the electronic lock 100 may include more than one input interface 202. For example, the exterior assembly 210 may include the keypad 502 and a biometric sensor.

In some examples, the electronic lock 100 may comprise a keyway 504 for receiving a key (not shown). For example, when a valid key is inserted into the keyway 504, the valid key can move the bolt 214 between the extended and retracted positions. In some embodiments, the exterior side 206 of the door 104 can also include a handle (not shown), which may be included in or separate from the electronic lock 100.

In some examples, the electronic lock 100 may include a code output interface 512 operative or configured to present a unique enrollment code, which when verified, may enable the electronic lock 100 to enter into the secure enrollment mode. For example, the code output interface 512 may include one or more lights (e.g., LEDs) operative to illuminate according to a specific cadence or a specific pattern (e.g., a static pattern or a dynamic pattern), a sound-emitting element operative to play an audible passcode using, a haptic actuator element operative to emit a haptic passcode, or another type of code output element that may be operative to present the unique enrollment code.

In some examples, the code output interface 512 may include the keypad 502 and/or buttons 508 of the electronic lock 100. For example, in a particular embodiment, the keypad 502 and/or buttons 508 may be further operative or configured to receive a signal from the processing unit 402 to illuminate one or more of the buttons 508 or indicia associated with the button 508 according to a specific cadence or a specific pattern (e.g., a static pattern or a dynamic pattern) based on the unique enrollment code. For example, the cadence or pattern of illumination of the buttons 508 may visually reveal the unique enrollment code, which may be sensed by or input into the guest mobile device 112 and verified for allowing the guest user to enroll an actuation passcode with the electronic lock 100. As an example, the actuation passcode may be a numeric, alphabetic, or alphanumeric passcode that the guest user 108 may input via the keypad 502.

The guest user 108 may use the guest mobile device 112 to capture the unique enrollment code presented by the code output interface 512 of the electronic lock 100, or the guest user 108 may observe the unique enrollment code presented by the electronic lock 100 and input the presented unique enrollment code into the UI provided by the client application 116. For example, the unique enrollment code may be verified by the client application 116 operating on the guest mobile device 112 or communicated to the server 114 for verification. Upon verification of the unique enrollment code, the electronic lock 100 may be instructed to enter into the secure enrollment mode, where the electronic lock 100 may be enabled to receive and store an actuation passcode input by the guest user 108 and/or to communicate and be paired with the guest mobile device 112 when the guest mobile device 112 is within short-range wireless communication range of the electronic lock 100.

In other example implementations, the unique enrollment code may be presented (e.g., visually, audibly, tactically) by the guest mobile device 112 and captured by a sensor 514 that may be included in the electronic lock 100. For example, the electronic lock 100 may include one or more sensors 514, such as a camera, a proximity sensor, a ceramic piezoelectric sensor, an accelerometer, or other type of sensor that may be operative or configured to capture a unique enrollment code presented by a mobile computing device. In other example implementations, the unique enrollment code may be presented (e.g., visually, audibly, tactically) by the guest mobile device 112 and observed by the guest user 108, who may use the keypad 502 or other input interface 202 to enter the unique enrollment code into the electronic lock 100. In some examples, the unique enrollment code may be verified by the electronic lock 100. In other examples, the unique enrollment code may be communicated to and verified by the server 114.

Still further, an electrical connection between the exterior assembly 210 and the interior assembly 208 allows the processing unit 402 to communicate with other features included in the exterior assembly 210.

FIG. 5 is a schematic representation of the electronic lock 100 mounted to the door 104. The interior assembly 208, the exterior assembly 210, and the latch assembly 212 are shown.

The exterior assembly 210 is shown to include the input interface 202, which may include the keypad 502 and an optional exterior antenna 602 usable for communication with a remote device. In some examples, the exterior assembly 210 can include one or more sensors 514 by which conditions exterior to the door 104 can be sensed. In response to such sensed conditions, notifications may be sent by the electronic lock 100 to the server 114, admin mobile device 110, or guest mobile device 112 including information associated with a sensed event (e.g., time and description of the sensed event, or remote feed of sensor data obtained via the sensor). In some examples, the exterior assembly 210 can include one or more sensors 514 by which the unique enrollment code may be received.

In some examples, the exterior antenna 602 is capable of being used in conjunction with an optional interior antenna 604, such that the processing unit 402 can determine where a mobile device is located. Only a mobile device (e.g., admin mobile device 110 or guest mobile device 112) that is paired with the electronic lock 100 and determined to be located on the exterior of the door 104 may be able to actuate (unlock or lock) the door. This prevents unauthorized users from being located exterior to the door 104 of the electronic lock 100 and taking advantage of an authorized mobile device that may be located on the interior of the door, even though that authorized mobile device is not being used to actuate the door. However, such a feature is not required, but can add additional security. In alternative arrangements, the electronic lock 100 may only be actuable from either the input interface 202 (via entry of a valid actuation passcode) or from the client application 116 installed on the mobile device (e.g., admin mobile device 110 or guest mobile device 112). In some implementations, the exterior antenna 602 may be excluded entirely.

Figure 6:
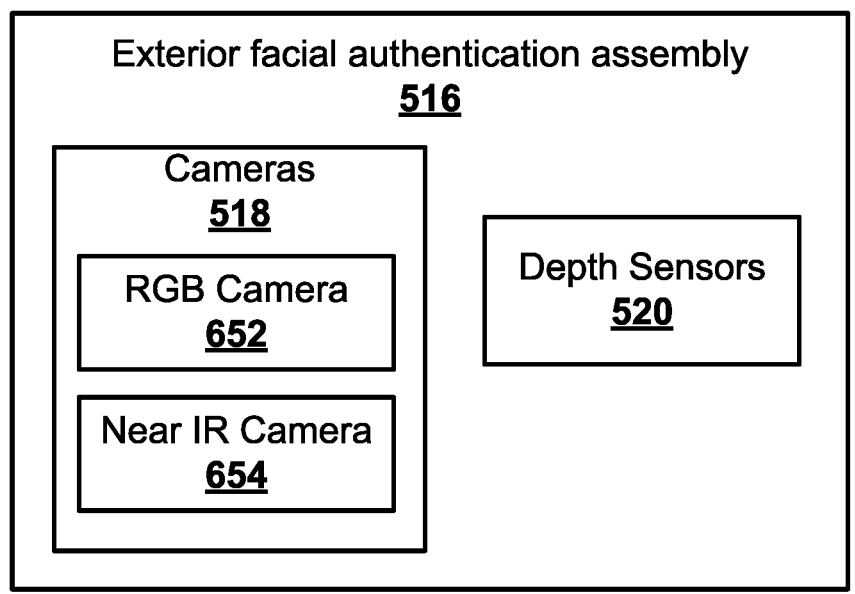
FIG. 6 is an illustration of a schematic view of the exterior sensors seen in the example schematic view of the electronic lock in FIG. 5.

The exterior assembly 210 is further shown to include an exterior facial authentication assembly 516. The exterior facial authentication assembly 516 contains electronic sensors for performing facial authentication or related features described herein. The exterior facial authentication assembly 516 sends signals including the data collected by the sensors to the processing unit 402. An example of the exterior facial authentication assembly 516 is illustrated in FIG. 6.

The interior assembly 208 includes the processing unit 402. The interior assembly 208 can also include a motor 606 and the optional interior antenna 604.

As shown, the processing unit 402 includes at least one processor 608 communicatively connected to a security chip 610, a memory 612, various wireless communication interfaces (e.g., including a WI-FI interface 614 and/or a BLUETOOTH interface 616), and a battery 618. The processing unit 402 is located within the interior assembly 208 and is capable of operating the electronic lock 100, (e.g., by actuating the motor 606 to actuate the bolt 214).

In a particular example, the BLUETOOTH interface 616 comprises a BLUETOOTH Low Energy (BLE) interface. Additionally, in some embodiments, the BLUETOOTH interface 616 is associated with a security chip 622, for example, a cryptographic circuit capable of storing cryptographic information and generating encryption keys usable to generate certificates for communication with other systems (e.g., the admin mobile device 110, the guest mobile device 112).

In some examples, the processor 608 can process signals received from a variety of devices to determine whether the electronic lock 100 should be actuated. Such processing can be based on a set of preprogramed instructions (i.e., firmware) stored in the memory 612. In certain embodiments, the processing unit 402 can include a plurality of processors 608, including one or more general purpose or specific purpose instruction processors. In some examples, the processing unit 402 is configured to capture an input interface input event from a user and store the input interface input event in the memory 612. In other examples, the processor 608 may receive a signal from the exterior antenna 602, the interior antenna 604, or a motion sensor 620 (e.g., a vibration sensor, gyroscope, accelerometer, motion/position sensor, or combination thereof) and can validate received signals in order to actuate the electronic lock 100. In still other examples, the processor 608 may receive signals from the BLUETOOTH interface 616 to determine whether to actuate the electronic lock 100. In some embodiments, the processor receives signals from the exterior facial authentication assembly and determines whether a user at the exterior of the door 104 is a user with permission to actuate the electronic lock.

In some examples, the interior assembly 208 also includes the battery 618 to power the electronic lock 100. In one example, the battery 618 may be a standard single-use (disposable) battery. Alternatively, the battery 618 may be rechargeable. In still further embodiments, the battery 618 is optional altogether, replaced by an alternative power source (e.g., an AC power connection).

In some embodiments, supplemental power devices can be added or connected to the electronic lock. In some embodiments, the battery 618 is connected to one or more photovoltaic cells (e.g., lowlight photovoltaic cells) which convert energy from light into electricity for powering the electronic lock or charge the battery 618. In other examples, a generator is placed inside the device that generates electricity which provides power to the lock or to charge the battery. Example methods of capturing and storing energy from external sources to supplement or recharge a lock battery are described in U.S. Pat. No. 9,644,401, entitled "ELECTRONIC LOCKSET WITH MULTI-SOURCE ENERGY HARVESTING CIRCUIT", the disclosure of which is hereby incorporated by reference in its entirety.

In some examples, the electronic lock contains wireless charging capabilities. In some examples, a nearby power source provides power using RF energy or by providing light. For example, an RF energy producing device is connected to the power for the doorbell and positioned to provide RF energy to the electronic lock. A power source for a nearby light could also be used to power an RF energy producing device. In some example, a nearby light source is turned on and positioned to direct light to one or more lowlight photovoltaic (PV) cells which convert the light into electricity which can be provided to the electronic lock. In some of these examples PV cells are located on the electronic lock. In some examples, one or more of these methods/systems are used as primary power source for recharging the battery. In other examples, one or more of these methods/systems are used as a supplementary power source.

In some examples, the electronic lock includes a backup battery. The backup battery can act as a secondary power source which is used when a primary power source is dead, disconnected, running low on power, etc. In some examples, the backup battery provides power to only a subset of components for the electronic lock. For example, the backup battery may operate the keypad and motor for the bolt but does not provide power to the facial authentication components. In other examples, the backup battery provides power while a primary battery is being charged or replaced. In some embodiments, the backup battery operates with one or more of the supplemental power sources described above.

In example embodiments, the backup battery may be a separate physical battery as compared to battery 618 seen in FIG. 5. In such instances, the backup battery may also be operatively connected to the processor 608. In alternative embodiments, the backup battery may be incorporated within battery 618, it may represent a portion of the overall capacitive battery 618. That is, once a battery 618 reaches a predetermined threshold capacity, the processor 608 may control the electronic lock 100 to power only portions of the circuitry included therein.

The interior assembly 208 may also include the motor 606 that may be capable of actuating the bolt 214. In use, the motor 606 may receive an actuation command from the processing unit 402, which causes the motor 606 to actuate the bolt 214 from the locked position to the unlocked position or from the unlocked position to the locked position. In some examples, the motor 606 actuates the bolt 214 to an opposing state. In some examples, the motor 606 receives a specified lock or unlock command, where the motor 606 may only actuate the bolt 214 if the bolt 214 is in the correct position. For example, if the door 104 is locked and the motor 606 receives a lock command, then no action may be taken. If the door 104 is locked and the motor 606 receives an unlock command, then the motor 606 may actuate the bolt 214 to unlock the door 104.

The optional interior antenna 604 may also be located in the interior assembly 208. In some examples, the interior antenna 604 may be operative or configured to operate together with the exterior antenna 602 to determine the location of the admin mobile device 110 or the guest mobile device 112. In some examples, only a mobile device determined to be located on the exterior side 206 of the door 104 may be able to unlock (or lock) the door 104. For example, this may prevent unauthorized users from being located near the electronic lock 100 and taking advantage of an authorized mobile device that may be located on the interior side of the door 104, even though the authorized mobile device is not being used to unlock the door 104. In alternative embodiments, the interior antenna 604 can be excluded entirely since the electronic lock 100 may be actuated only by an authorized mobile device.

In some embodiments, the processing unit 402 may include a security chip 610 that is communicatively interconnected with one or more instances of the processor 608. In some examples, the security chip 610 can, for example, generate and store cryptographic information usable to generate a certificate usable to validate the electronic lock 100 with a remote system, such as the server 114 or mobile device (e.g., admin mobile device 110 or guest mobile device 112).

In certain embodiments, the security chip 610 may include a one-time write function in which a portion of memory of the security chip 610 can be written only once, and then locked. Such memory can be used, for example, to store cryptographic information derived from characteristics of the electronic lock 100, or its communication channels with server 114, the admin mobile device 110, or the guest mobile device 112. Accordingly, once written, such cryptographic information can be used in a certificate generation process which ensures that, if any of the characteristics reflected in the cryptographic information are changed, the certificate that is generated by the security chip 610 would become invalid, and thereby render the electronic lock 100 unable to perform various functions, such as communicate with the server 114, the admin mobile device 110, or the guest mobile device 112, or operate at all, in some cases.

In some embodiments, the security chip 610 may be configured to generate a unique enrollment code that, when received by the guest mobile device 112 and validated, triggers a secure enrollment mode of the electronic lock 100. In some examples, the secure enrollment mode may enable the electronic lock 100 to receive an actuation passcode from a user and store the actuation passcode in the memory 612. In other examples, the secure enrollment mode may enable the electronic lock 100 to pair with a proximate mobile device (e.g., guest mobile device 112 on which the client application 116 is operating).

In some examples, the unique enrollment code may be a random value. In other examples, the administrative user 106 may be enabled to change the unique enrollment code by setting their own code or by requesting a random value to be generated by the client application 116 operating on the admin mobile device 110. In some examples, the length of the unique enrollment code is variable. According to an aspect, for increased security, the unique enrollment code may be a limited-use passcode. For example, the unique enrollment code may be limited to a single use or may be active for a preset or administrative user-selected time duration.

The memory 612 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

The processing unit 402 can include one or more wireless interfaces, such a WI-FI interface 614 and/or a BLUETOOTH interface 616. Other RF circuits can be included as well. In the example shown, the interfaces 614, 616 are capable of communication using at least one wireless communication protocol. In some examples, the processing unit 402 can communicate with a remote device via the WI-FI interface 614, or a local device via the BLUETOOTH interface 616. In some examples, the processing unit 402 can communicate with the admin mobile device 110 or the guest mobile device 112 and the server 114 via the WI-FI interface 614, and can communicate with the admin mobile device 110 or the guest mobile device 112 when the mobile device is in proximity to the electronic lock 100 via the BLUETOOTH interface 616. In some embodiments, the processing unit 402 may be configured to communicate with the admin mobile device 110 or the guest mobile device 112 via the BLUETOOTH interface 616, and communications between the admin mobile device 110 or the guest mobile device 112 and electronic lock 100 when the admin mobile device 110 or the guest mobile device 112 is out of range of BLE wireless signals can be relayed via the server 114, e.g., via the WI-FI interface 614. In some examples WI-FI 6 technologies are used by the electronic lock.

As should be appreciated, in alternative embodiments, other wireless protocols can be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 214. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (BLUETOOTH®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 608 may receive a signal at the BLUETOOTH interface 616 via a wireless communication protocol (e.g., BLE) from the admin mobile device 110 or the guest mobile device 112 for communication of an intent to actuate the electronic lock 100. The processor 608 can also initiate communication with the server 114 via the WI-FI interface 614 (or another wireless interface) for purposes of validating an attempted actuation of the electronic lock 100, or receiving an actuation command to actuate the electronic lock 100.

In a particular embodiment, the processor 608 may receive a signal via the WI-FI interface 614 for communication of a unique enrollment code, which the processor may be instructed to present for validating the guest user 108. Additionally, the processor 608 may receive a signal from the server 114 via the WI-FI interface 614 or from the guest mobile device 112 via the BLUETOOTH interface 616 for communication of a successful validation of the unique enrollment code and authorization to complete enrollment of the guest user 108.

Additionally, various other settings can be viewed and/or modified via the WI-FI interface 614 from the server 114. As such, the administrative user 106 or the guest user 108 may use the admin mobile device 110 or the guest mobile device 112 to access an account associated with the electronic lock 100, such as to view and modify settings of that lock, which may then be propagated from the server 114 to the electronic lock 100. In alternative embodiments, other types of wireless interfaces can be used; generally, the wireless interface used for communication with a mobile device can operate using a different wireless protocol than a wireless interface used for communication with the server 114.

In some example embodiments, the electronic lock 100 may include an integrated motion sensor 620. Using such a motion sensor (e.g., an accelerometer, gyroscope, or other position or motion sensor) and wireless capabilities of a mobile device or an electronic device (i.e., fob) with these capabilities embedded inside can assist in determining various types of motion events (e.g., a door opening or door closing event, a lock actuation or lock position event, or a knock event based on vibration of the door). In some cases, motion events can cause the electronic lock 100 to perform certain processing (e.g., to communicatively connect to or transmit data to a mobile device 110, 112 in proximity to the electronic lock 100; to present a unique enrollment code). In alternative embodiments, other lock actuation sequences may not require use of a motion sensor 620. For example, if the admin mobile device 110 or the guest mobile device 112 is in valid range of the electronic lock 100 when using a particular wireless protocol (e.g., BLE), then a connection may be established with the electronic lock 100. Other arrangements are possible as well, using other connection sequences and/or communication protocols.

In some embodiments, the motion sensor 620 operates to detect motion and wake-up the exterior facial authentication assembly 516 components as a user approaches the door. In some examples, the facial authentication assembly 516 components, once turned on, are able to perform facial authentication as the user is walking up to the door and will actuate the lock automatically before the user arrives at the door.

Referring to FIGS. 1-6 generally, in example embodiments, the electronic lock 100 may be used on both interior and exterior doors 104. Described above are non-limiting examples of a wireless electronic lockset. It should be noted that the electronic lock 100 may be used on other types of doors 104, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

FIG. 6 illustrates a schematic diagram of an exterior facial authentication assembly 516. The exterior assembly includes cameras 518 and a depth sensor 520. In some embodiments, the cameras include an RGB camera 652 and a near IR camera 654. In some embodiments, all the components of the facial authentication assembly 516 are turned on. In other examples, an exterior wake-up signal is sent to turn on the facial authentication assembly 516. In some examples, the RGB camera 652 is turned on and receives images to detect motion. Once motion is detected, the other components receive a wake-up signal. In other examples, the near IR camera 654 operates to detect motion.

In the typical example, the exterior facial authentication assembly 516 includes two cameras 518. In alternative examples, a single camera may be used or three or more cameras may be used. In some examples, the cameras are embedded in the electronic lock. In other examples, the cameras may be located elsewhere. In some examples, one or more of the cameras may be part of a security system or part of a smart doorbell.

In the example shown, the cameras 518 include an RGB Camera 652. In some examples, the RGB camera 652 captures a 2D image including facial data about a user. In some embodiments, two or more RGB cameras capture 2D images which are processed to determine depth based on a comparison of the image from two different cameras. The camera collects data which is used to create a facial authentication profile. In some examples, the images captured from the RGB camera 652 are provided to a model which is trained to detect various facial features of interest. These features are used to identify a user and authenticate that the user has permission to actuate the electronic lock.

In the example shown, the cameras 518 include a near IR camera 654. The IR camera 654 operates to detect and measure the infrared energy of objects. In some embodiments, the IR camera operates as a motion detector. The data collected by the near IR camera 654 can be used as part of the facial authentication profile.

The depth sensor 520 operates to further collect depth data related to a user's face. Depth information collected from the depth sensor 520 is provided as part of the facial authentication profile. In alternative embodiments, two cameras operate to capture depth data.

In further examples, the exterior facial authentication assembly 516 includes a light which is projected from the lock to perform facial authentication in low light conditions. In other examples, a light is not needed to perform facial authentication in low light conditions.

Figure 7:
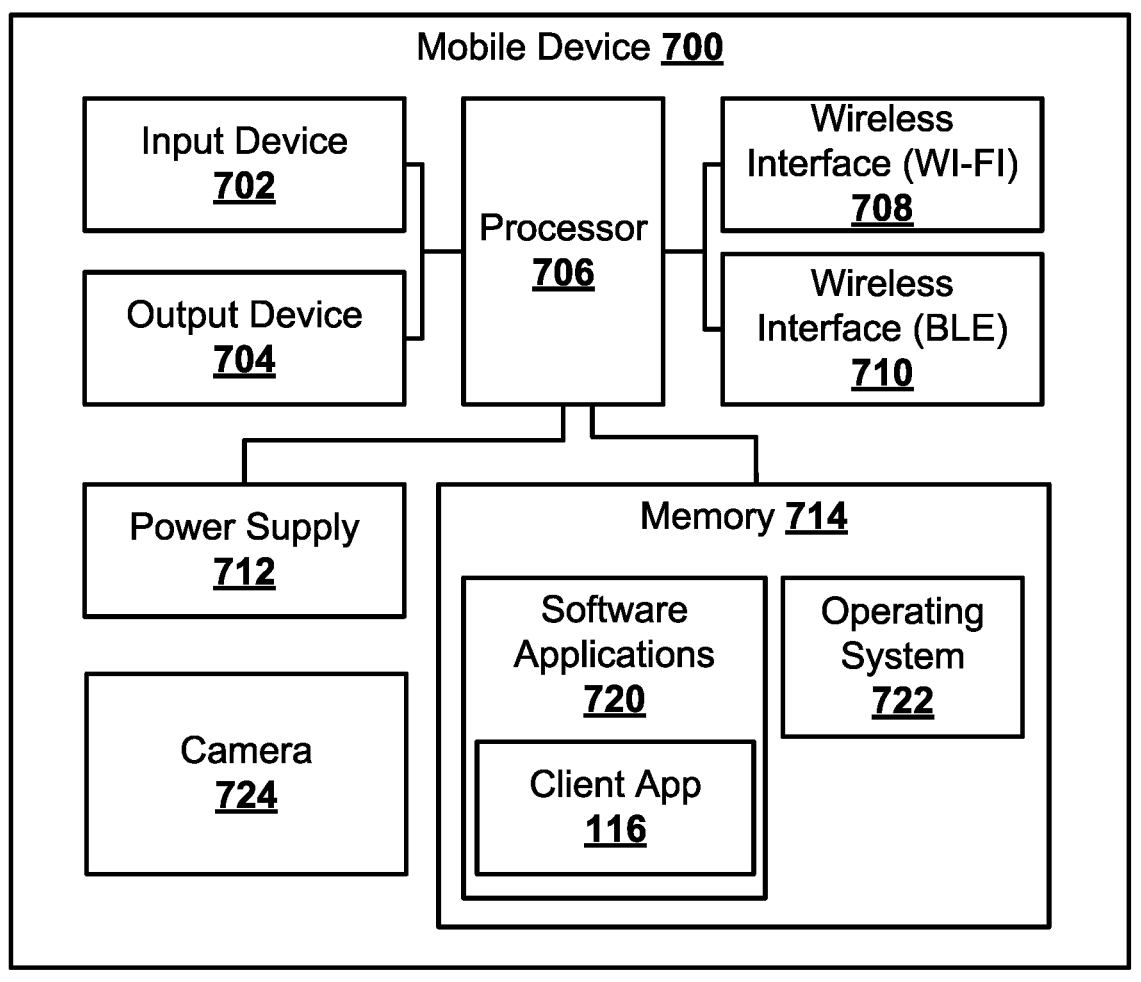
FIG. 7 illustrates a schematic diagram of an example mobile device.

FIG. 7 illustrates a schematic diagram of a mobile device 700, such as the admin mobile device 110 and the guest mobile device 112, usable in embodiments of the disclosure to enable secure enrollment of the guest user 108 with the electronic lock 100. For example, one or more aspects of the present disclosure may be utilized to enable the guest user 108 to enroll as a guest user with the electronic lock 100, without requiring access to the interior assembly 208 of the electronic lock 100.

In some embodiments, the mobile device 700 operates to form a BLUETOOTH or BLE connection with a network enabled security device such as the electronic lock 100. The mobile device 700 may then communicate with the server 114 via a WI-FI or mobile data connection. The mobile device 700 thus can operate to communicate information between the electronic lock 100 and the server 114. The mobile device 700 shown in FIG. 7 includes an input device 702, an output device 704, a processor 706, a wireless WI-FI interface 708, a wireless BLE interface 710, a power supply 712, and a memory 714.

The input device 702 operates to receive input from external sources. Such sources can include inputs received from a user (e.g., the administrative user 106 or the guest user 108) and/or inputs received from the electronic lock 100. For example, inputs received from a user can be received through a touchscreen, a stylus, a keyboard, a microphone, a camera, etc. In other examples, inputs received from the electronic lock 100 can be received via the camera, the microphone, a motion sensor (e.g., an accelerometer, gyroscope, or other position or motion sensor), or other type of sensor. According to a particular example, the guest mobile device 112 may operate to receive the unique enrollment code presented by the electronic lock 100 via the input device 702.

The output device 704 operates to provide output of information from the mobile device 700. In one example, a display can output visual information. In another example, a speaker can output audio information. In some examples, the output device 704 may operate to present a unique enrollment code, which may be input into or sensed by the electronic lock 100 for verifying the guest user 108 and enabling the secure enrollment mode of the electronic lock 100. In addition, location data of the mobile device 700, such as GPS information, may be provided to the electronic lock via the output device 704 or vie either of interfaces 708,

710 described below, to provide further information to the electronic lock regarding the current presence/location of the mobile device 700.

The processor 706 operates to read data and instructions. For example, the data and instructions can be stored locally, received from an external source, or accessed from removable media.

The WI-FI interface 708 may operate similarly to the WI-FI interface 614. A WI-FI connection, for example, can be established with the server 114.

The wireless (BLE) interface 710 may operate similarly to the BLUETOOTH interface 616. A BLE connection, for example, can be established with the electronic lock 100.

The power supply 712 may operate to provide power to the processor 706 and other electronics.

The memory 714 includes software applications 720 and an operating system 722. The memory 714 contains data and instructions that are usable by the processor 706 to implement various functions of the mobile device 700.

The software applications 720 can include applications usable to perform various functions on the mobile device 700. One such application is the client application 116. In one example implementation, when the client application 116 is operating on the admin mobile device 110, the client application 116 can be configured to provide a user interface, receive a selection to enroll the guest user 108 as a guest user of the electronic lock 100, and communicate the enrollment selection to the server 114 for generating a unique enrollment code that can be used to validate the guest user 108 and allowing the guest user 108 to complete enrollment with the electronic lock 100. In another example implementation, when the client application 116 is operating on the guest mobile device 112, the client application 116 can be configured to provide a user interface, receive a selection to complete enrollment with the electronic lock 100 (e.g., when the guest mobile device 112 is within proximity to the electronic lock 100), receive the unique enrollment code presented by the electronic lock 100, and validate the received unique enrollment code or use the server 114 to validate the received unique enrollment code. For example, upon validation of the unique enrollment code, the electronic lock 100 may enter the secure enrollment mode, where the guest user 108 may be enabled to complete enrollment with the electronic lock 100.

In some examples, when the electronic lock 100 is in secure enrollment mode, the electronic lock 100 may be triggered to enter a BLUETOOTH pairing mode, which may enable the guest mobile device 112 and the electronic lock 100 to perform a pairing process, which when completed, enables the guest user 108 to perform at least a subset of electronic lock actions (e.g., actuate the electronic lock 100, add an access/actuation passcode) via the client application 116.

In some embodiments, the mobile device 700 includes a camera 724. In some of these examples, the mobile device is able to perform facial authentication with built in components. In some examples, the facial authentication profile for a user is calibrated on a mobile device. In other examples, the mobile device may perform facial authentication on the device before providing a lock accessing certificate to the lock over a secured wireless channel. In further examples, the mobile device may use facial authentication as a backup mode to actuate an electronic lock.

Figure 8:
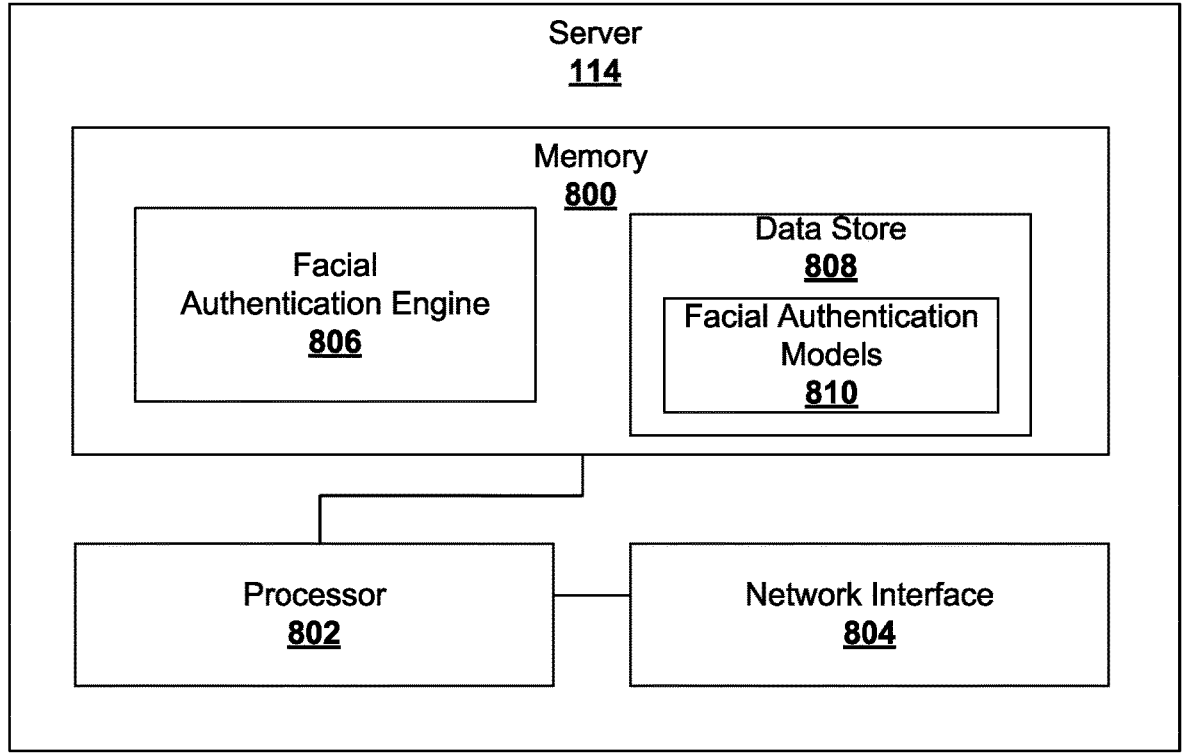
FIG. 8 illustrates a schematic diagram of an example server.

FIG. 8 illustrates a schematic diagram of a server 114 usable in embodiments of the disclosure for an electronic lock with facial authentication features. The server 114 can be owned and maintained by a manufacturer of the electronic lockset that needs to be authenticated before use, or can be a virtual server provided by a cloud hosting service to such a manufacturer for use. The server 114 includes a memory 800, a processor 802, and a network interface 804.

The memory includes a facial authentication engine 806 and a data store 808. The facial authentication engine 806 operates to provide facial authentication models and profiles to the electronic lock. In some examples, the facial authentication models are pretrained. In some examples, the models are trained using machine learning. In some examples, the facial authentication is done using a neural network which is either pretrained or trained as the lock is used over time.

In typical embodiments, the facial authentication process is performed on the electronic lock. In some alternative embodiments, the data store 808 functions to store information needed to perform backend processes for facial authentication. In some examples, a set of pretrained facial authentication models 810 are stored in the data store 808. In a typical example, one or more of the models are downloaded at the electronic lock from the server. In some examples, the facial authentication model is trained at the lock and a backup copy is uploaded to the server 114 and stored in the data store 808.

The processor 802 operates to execute instructions stored on the memory.

The network interface 804 operates to establish connections to the electronic lockset as well as mobile devices described herein (e.g., the admin mobile device and the guest mobile device).

Figure 9:
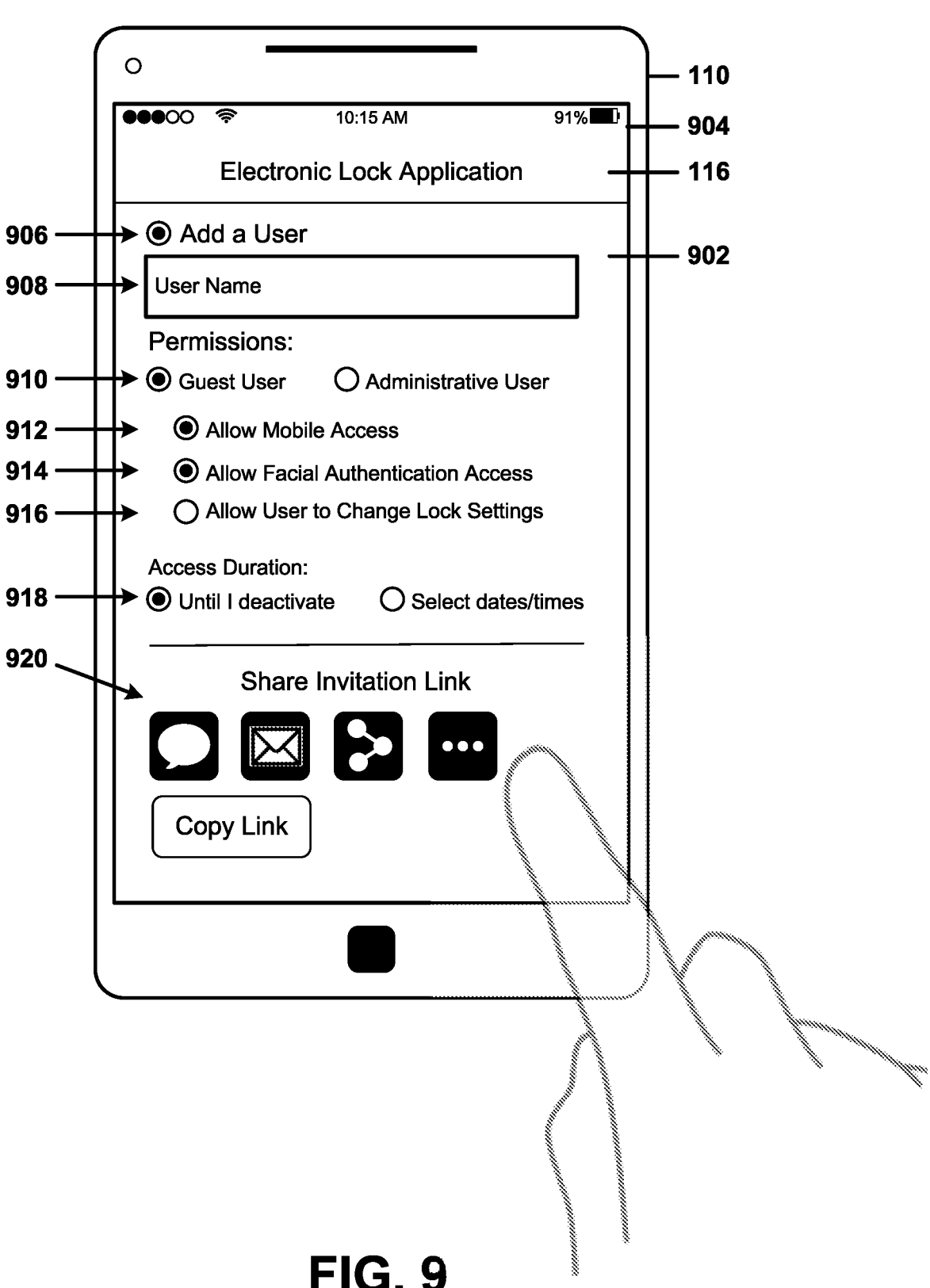
FIG. 9 illustrates a representation of an example user interface provided by an electronic lock application.

FIG. 9 illustrates a representation of an example UI 902 that may be provided by the electronic lock application operating on the admin mobile device 110 is shown. For example, the UI 902 shown in FIG. 9 is a representation of a UI that may be displayed on a screen 904 of the admin mobile device 110 and that the administrative user 106 may use to select to add the guest user 108 as a user of the electronic lock 100.

According to an aspect, the UI 902 may include various options associated with selecting to add a new user of the electronic lock 100. In some examples, the administrative user 106 may have more than one electronic lock 100 associated with the administrative user account, and the UI 902 may include a listing (not shown) of the electronic locks 100 associated with the account from which the administrative user 106 may select the intended lock. In some examples, when the intended electronic lock 100 is selected (by the administrative user 106 or automatically), the UI 902 may include an option 906 to add a user to the electronic lock 100.

In some examples, upon selection of the option 906 to add a user, the UI 902 may further include an option 908 to enter information about the user, such as the user's name. In some examples, the UI 902 may further include additional options, such as an option 910 to enter permission levels (e.g., guest user 108 versus an administrative user 106); an option 912 to allow the user to have mobile facial authentication (e.g., with the client application 116 to actuate the lock); an option 914 to allow the user to use facial authentication to actuate the electronic lock 100; an option 916 to allow the user to change lock settings; an option 918 to select a duration of access for the user; and one or more options 920 to share an invitation link with the guest user 108. In some examples, the one or more invitation link sharing options 920 may include an option to send the invitation link via text message, email, social media message, or another communication method.

In some examples, selection to share the invitation link via a particular communication method may operate to instruct the admin mobile device 110 to open a communication application on the admin mobile device 110 and initiate a communication that includes the invitation link and that can be sent to the guest user 108. For example, the administrative user 106 may input the guest user's contact information and send the invitation link to the guest user 108.

In other examples, selection to share the invitation link via a particular communication method may operate to provide an option to input the guest user's contact information and another option to send the invitation link, which when selected, may instruct the server 114 to send the invitation link to the guest user 108 based on the input contact information.

In other examples, an option may be provided to copy the invitation link, which the administrative user 106 may be enabled to paste into a communication that may be sent to the guest user 108 via a particular communication method. As should be appreciated, additional and/or alternative options may be provided in the UI 902 and are within the scope of the present disclosure.

Figure 10:
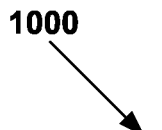
FIG. 10 illustrates an environment with an example user interface provided by an electronic lock application.
Figure 10:
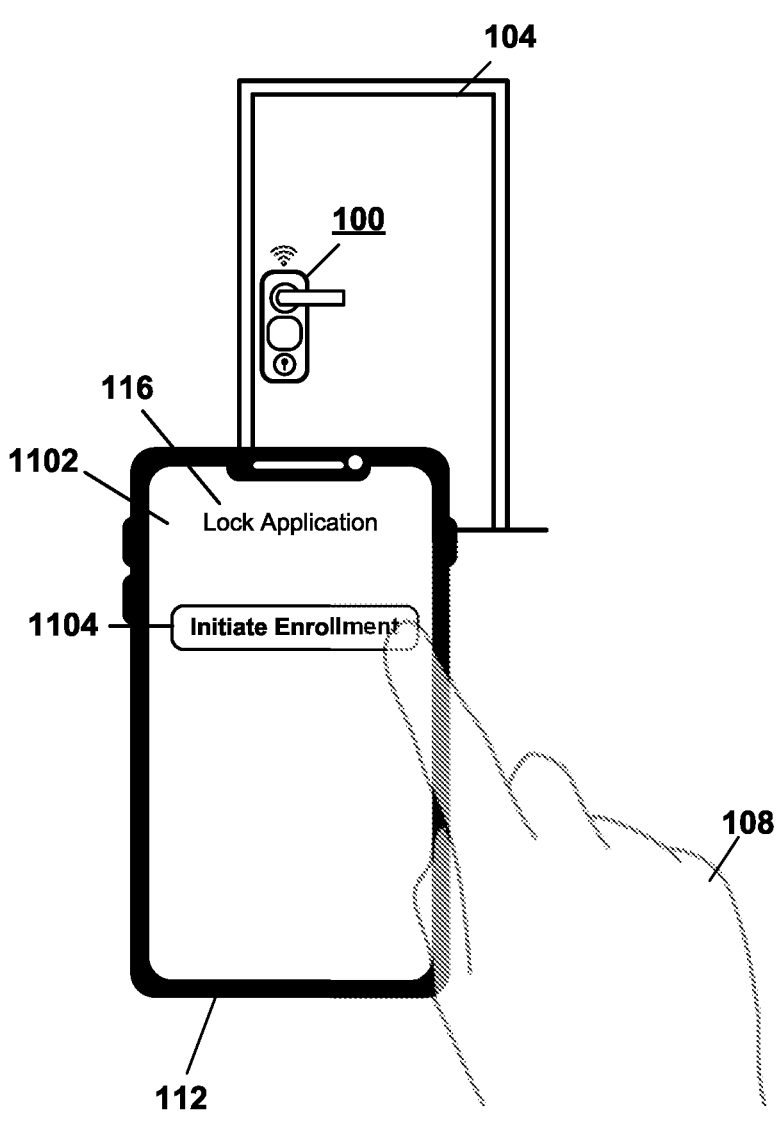

FIG. 10 illustrates, an environment 1000 with an example UI 1102 that the client application 116 may operate and display on a screen of the guest mobile device 112. Also shown is the electronic lock 100 installed on the door 104. For example, the example UI 1102 may be included in a landing page displayed by the client application 116 after the client application 116 is installed or opened on the guest mobile device 112. In some examples and as shown, the UI 1102 may include an option 1104 to initiate enrollment with the electronic lock 100. For example, responsive to a selection of the option 1104 to initiate enrollment, a communication may be provided to the electronic lock 100 to initiate the secure enrollment process. In some examples, the secure enrollment process includes creating a facial authentication profile for the guest user.

Figure 11:
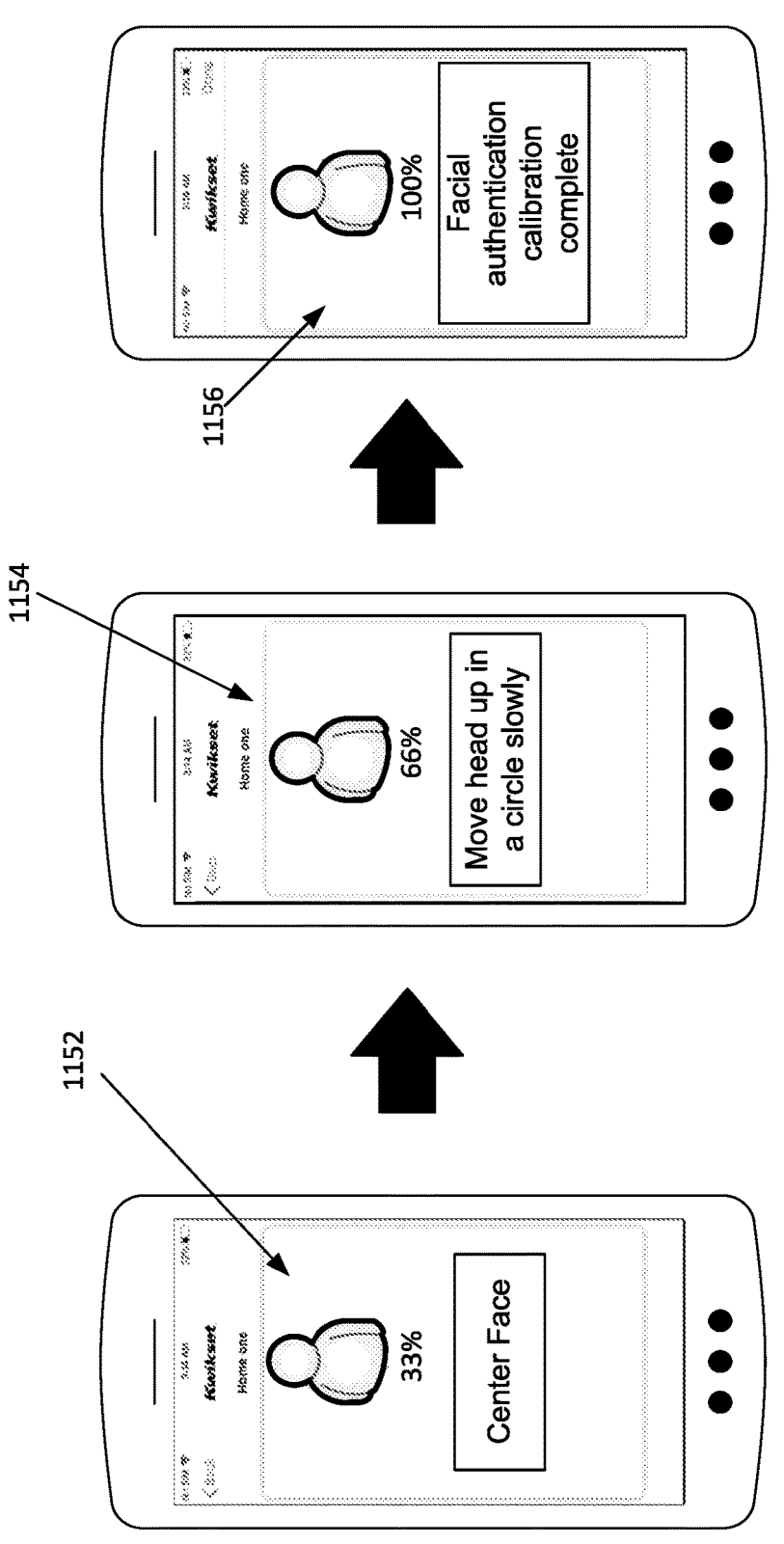
FIG. 11 illustrates, a user interface flow for creating a facial authentication profile at an electronic lock.

FIG. 11 illustrates, a user interface flow 1140 for creating a facial authentication profile at an electronic lock. The UI 1152 displays an interface of a first status message. In some examples, the UI includes instructions to the user to calibrate the facial authentication profile for a user. For example, the UI 1152 may provide instructions to tell the user to center their face in view of the camera(s) on the electronic lock. The UI 1154 displays a second status message. The UI 1156 displays a final status message. Many more status messages may be displayed in addition to, or instead of, the messages displayed on the UIs 1152, 1154, and 1156.

Figure 12:
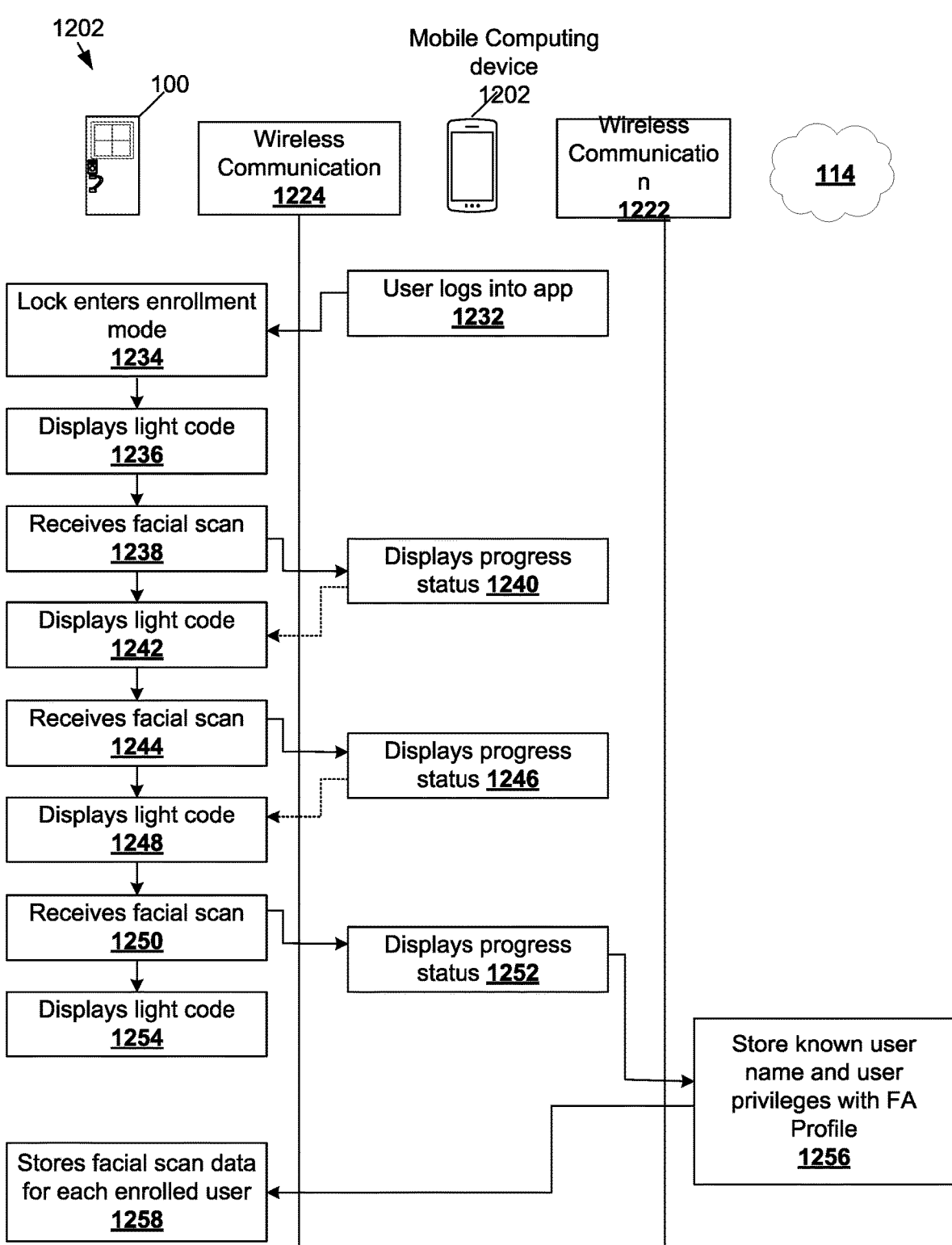
FIG. 12 illustrates a flow chart for an example process for creating a facial authentication profile.

FIG. 12 illustrates a flow chart for an example process 1202 for creating a facial authentication profile for a user. The user can be the administrative user or the guest user. In some examples, the user is a user from a trusted list of users. In the example shown, the server 114 communicates with the mobile device 1202 and the electronic lockset 100 via wireless communication 1222 and the electronic lockset 100 communicates with the mobile device 1202 via the wireless communication 1224.

At step 1232, a user logs into an application installed on a mobile device 1202 having a wireless communication interface and a display. The administrative user is able to enroll and edit electronic lock permissions for other users. In some examples, the admin user invites a guest user to enroll at the electronic lockset 100. In some of these examples, the invitation is sent with an enrollment code. In some examples, the enrollment code is a passcode which is entered at the electronic lock.

In an alternative embodiment, the enrollment code is encoded into a machine readable code. For example, a QR code. In these examples, to begin enrollment at the electronic lock, the user can hold up the machine readable code on the mobile device 1202 so the camera on the electronic lock 100 can scan the code. The electronic lock 100 decodes the machine readable code, verifies the enrollment code, and enters enrollment mode at step 1234.

In some embodiments, at step 1234, the electronic lock 100 enters an enrollment mode. An enrollment mode allows a new user to create a facial authentication profile at the electronic lock. In some examples, the user is not allowed to actuate the electronic lock while the lock is in the enrollment mode. In some examples a light code 1236 is displayed at the electronic lock which provides an indication to the user that the electronic lock is in the enrollment mode.

At step 1238, the electronic lock receives a facial scan from a user. In some examples, the lock provides visual and/or audio instructions for the user to place their head at a location which allows the lock to begin a facial scan. In some examples, these instructions are provided from the mobile device 1202. In alternative embodiments, the mobile device 1202 includes the sensors and cameras necessary to create a facial profile which is given to the electronic lock after the facial authentication profile is created.

At step 1240, the mobile device 1202 displays progress for enrolling a user with facial authentication at the electronic lock. An example of a UI displayed at step 1240 is the UI 1152 illustrated in FIG. 11.

At step 1242, a second light code is displayed on the electronic lock 100. In some embodiments, the second light code indicates progress in the enrollment process. For example, the second light code may display a message or a set of lights which correspond with a percentage for the progress on creating a facial authentication profile.

In an embodiment, the process occurring at steps 1238, 1240, and 1242 may be repeated one or more times to fully capture the facial authentication data. For example, the process may be repeated as shown in steps 1244, 1246, and 1248, respectively, as described below. In some examples, one continuous facial scan is received with the user moving their head (e.g., up, down, side to side, and in a circle) until enough facial scan data is collected to create a complete facial authentication profile. Once the electronic lock 100 receives sufficient facial authentication data to create a complete facial authentication profile, the enrollment process is completed.

At step 1244, the electronic lock 100 receives a second facial scan from a user. After receiving the second facial scan, in some embodiments, the electronic lock 100 sends a notification to the application on the mobile device 1202. After receiving notification at step 1246, the mobile device 1202 displays a second status message. An example for the second status message is illustrated in the UI 1154 illustrated in FIG. 11. Additionally, at step 1248, the electronic lock 100 displays a third light code. In example implementations, the third light code is different than the second light code and the first light code. The second status message is different than the first status message. In example implementations in which the electronic lock 100 sends a notification to the mobile device 1202 regarding the facial authentication calibration, the second status message and the third light code can be displayed concurrently at their respective devices, and are indicative of an intermediate state of the data capture. For example, the third light code displayed on the electronic lock 100 may be a display of three lights, and the second status message on the application may be a display of a percentage of the data captured (or percentage completion of an overall enrollment process generally).

At step 1250, the electronic lock 100 continues to receive a facial scan from the user. After completing the facial scan, the electronic lock 100 sends a notification to the application on the mobile device 1202. After receiving the notification at step 1252, the mobile device 1202 displays a facial scan complete status message. An example of a UI displaying a facial scan complete status message is illustrated as the UI 1156 in FIG. 11. At the same time, step 1254 displays a fourth light code indicating that the facial scan process is complete.

Step 1256 stores the facial authentication profile with a known user name and user privileges. The user name and known privileges are sent to the lockset 100. At step 1258, the lockset 100 stores the facial authentication profiles for each known user and their corresponding privileges. The facial authentication profile is compared to facial scan data received at the lock to actuate the lock. In some examples, the facial authentication data is only stored at the electronic lock 100 and not the server 114.

Figure 13:
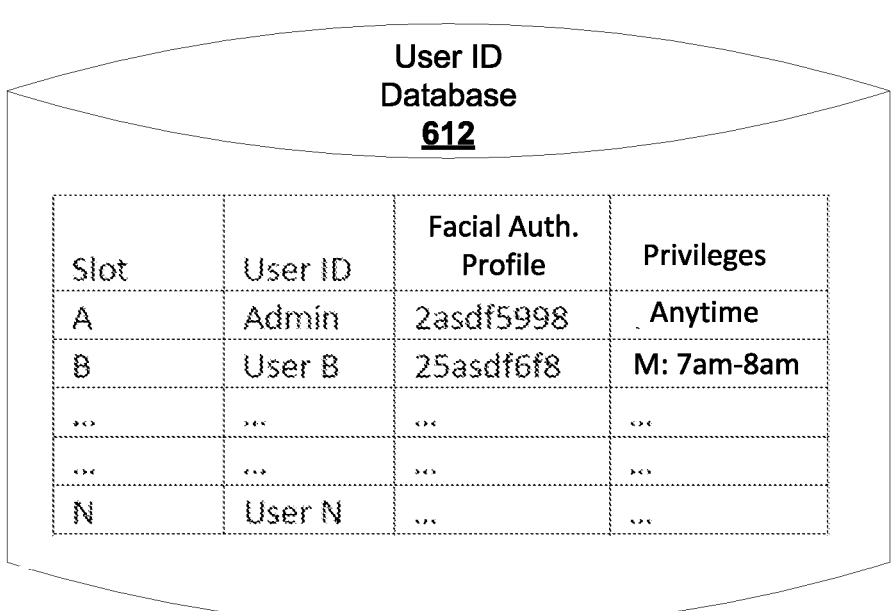
FIG. 13 illustrates a user identification database useful to store the received fingerprint data and to which user the facial authentication profile corresponds.

FIG. 13 illustrates a user ID database 612 useful to store the received fingerprint data and associations between users and facial authentication profiles. The user ID database 612 can also store privilege information, for each user, where privilege information determines when a user is able to unlock the electronic lockset. For example, an administrative user can unlock or lock the electronic lockset at all times, but another user may only be able to unlock or lock the electronic lockset on Mondays between 7:00 am and 8:00 am. In some embodiments, the user ID database 612 is maintained within the electronic lockset. For example, with a memory or other data storage includes in the electronic lock. In alternative embodiments, the user ID database 612 is stored at a server or server system.

In the example shown, the user ID database 612 maintains a table of information corresponding to known users of the lockset. The user ID database 612 includes a predetermined number of memory slots, wherein each memory slot stores a set of information unique to an individual user. The memory, and specifically the user ID database 612, is functional in a programming or enrollment mode and a comparison mode. In the programming mode, the set of information unique to an individual is capable of being edited by an administrative user (e.g., by being accessed via a mobile device or synchronized with settings within a mobile application controlled by that administrative user). In the comparison mode, the user ID database 612 is used to compare facial authentication data received at the facial authentication sensors with the information stored in the table.

The table maintains information corresponding to individual users. The table includes multiple memory slots, a user identification field, facial authentication profile, and a privilege indication for each user. Each memory slot stores a set of information unique to an individual user. In the example shown, each of the slots corresponds to a unique and individual user. The user identification field stores the identity of each user. The identity of each user may correspond to a name, or other means of identification, such as "administration," or "user A."

The facial authentication profile is unique to each individual user and is stored in the table, which is stored at the electronic lock. The facial authentication profile includes a collection of data representing key facial characteristics for authenticating a user. Data can include data collected from one or more cameras (RGB camera and/or IR Camera), and a depth sensor. In some examples, the facial authentication profile includes the users face from various angles and head positions.

The time at which a user may unlock or lock the electronic lockset is stored at privilege indication. An administrative user determines when users are able to unlock and lock the electronic lockset. For example, an administrative can unlock or lock the electronic lockset at all times, but another user may only be able to unlock or lock the electronic lockset on Mondays between 7:00 am and 8:00 am.

In accordance with the present disclosure, a number of additional features may be incorporated within an electronic lock having facial authentication features. Such features are described generally below, in connection with the electronic lock, mobile application, and user accounts described above.

Electronic Lock with Facial Authentication Features

As discussed above, the present disclosure relates generally to systems and methods for an electronic lock with facial authentication features. A wireless smart lock with facial authentication technology is used to provide some of the electronic lock features described below. Typically, the facial authentication process is performed on the electronic lock. In some examples, the hardware required for facial authentication includes one or more cameras. The one or more cameras may be used to provide additional electronic lock features described herein. In some examples, an electronic lock with facial authentication features may have different power requirements than a traditional electronic lock requiring additional power storage or include wake-up/turn off algorithms which optimize the electronic locks power usage.

Integration of Electronic Lock with a Smart Doorbell

Figure 14:
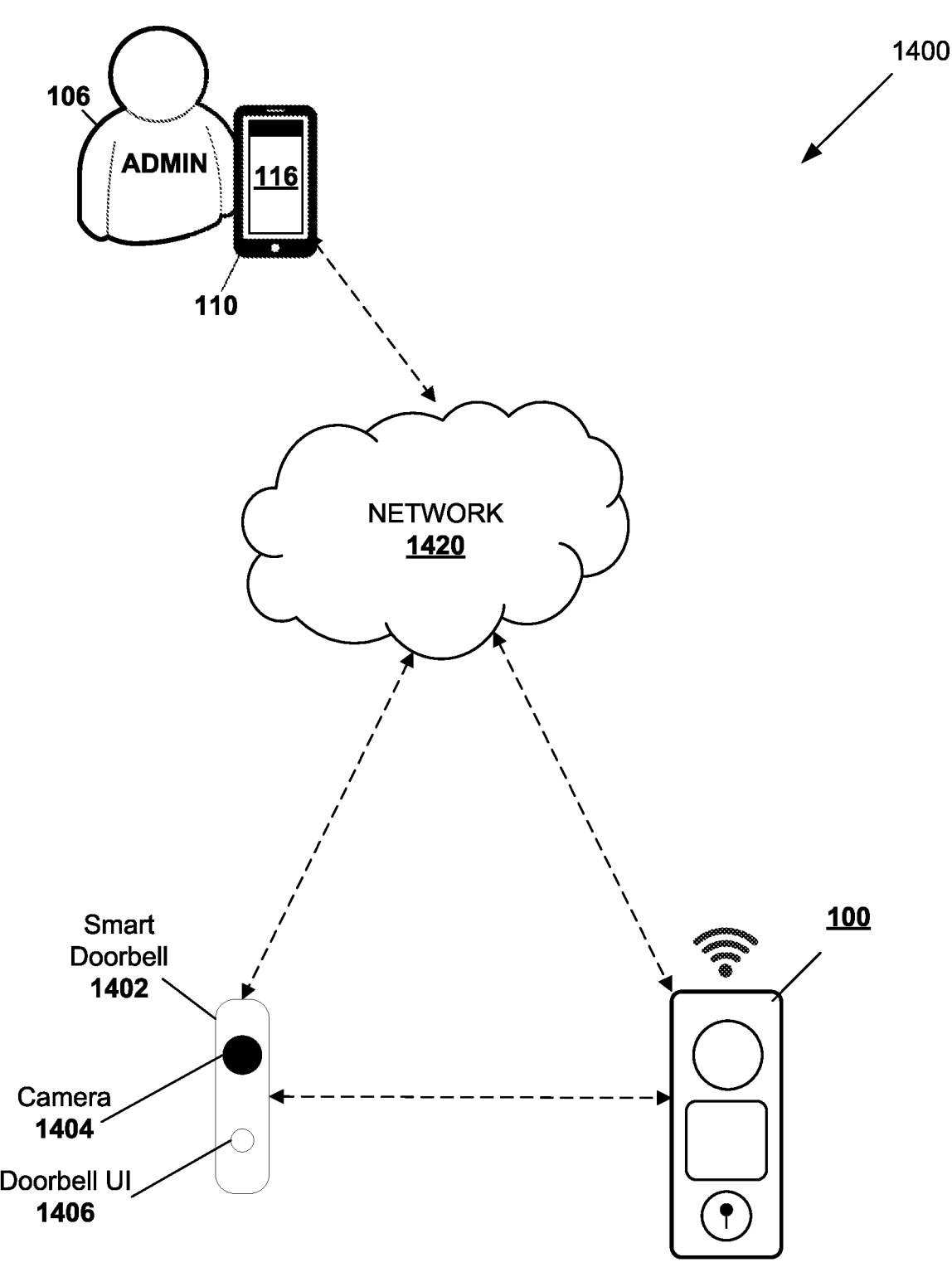
FIG. 14 illustrates an electronic lock in a system with a smart doorbell device.

FIG. 14 illustrates an electronic lock 100 in a system 1400 with a smart doorbell device. The system 1400 includes an administrative user 106 operating an admin mobile device 110, which operates with the electronic lock 100 and a smart doorbell 1402 via a network 1420. The admin mobile device operates a client application 116. The smart doorbell 1402 includes a camera 1404 and a doorbell UI 1406.

The smart doorbell 1402 is a doorbell which includes electronic communication connectivity. Various examples of electronic communication protocols are described herein. In some embodiments, when a user selects the doorbell UI 1406 the admin user receives a notification on the admin mobile device 110.

In some embodiments, the smart doorbell 1402 is configured to connect directly with the electronic lock 100. In some examples, the smart doorbell 1402 sends a wake-up signal to the electronic lock to wake up one or more components on the electronic lock. In some embodiments, the smart doorbell 1402 includes the components necessary to perform facial authentication. In these examples, the smart doorbell 1402 sends messages to the electronic lock based on verifying a user with facial authentication.

In some examples, the system 1400 operates with an electronic lock 100 which does not include facial authentication capabilities. In other examples, the electronic lock 100 does have facial authentication capabilities.

In some embodiments, the electronic lock 100 includes facial authentication capabilities and acts as the primary authentication mechanism for actuating the lock. In these embodiments, the smart doorbell 1402 can be used as a backup or secondary authentication mechanism. For example, in some embodiments, when the electronic lock 100 battery power is below a threshold, the electronic lock 100 may turn off or otherwise deactivate the facial authentication hardware on the electronic lock. In this embodiment, the smart doorbell 1402 can be used to perform facial authentication and allow the user to actuate the electronic lock 100. In some of these embodiments, the user may receive a notification on a user device or from the electronic lock (e.g., an indicator light, audio message, visual message, etc.), which informs the user that the facial authentication on the electronic lock 100 is not active and instructs the user to use the doorbell to perform facial authentication.

Figure 15:
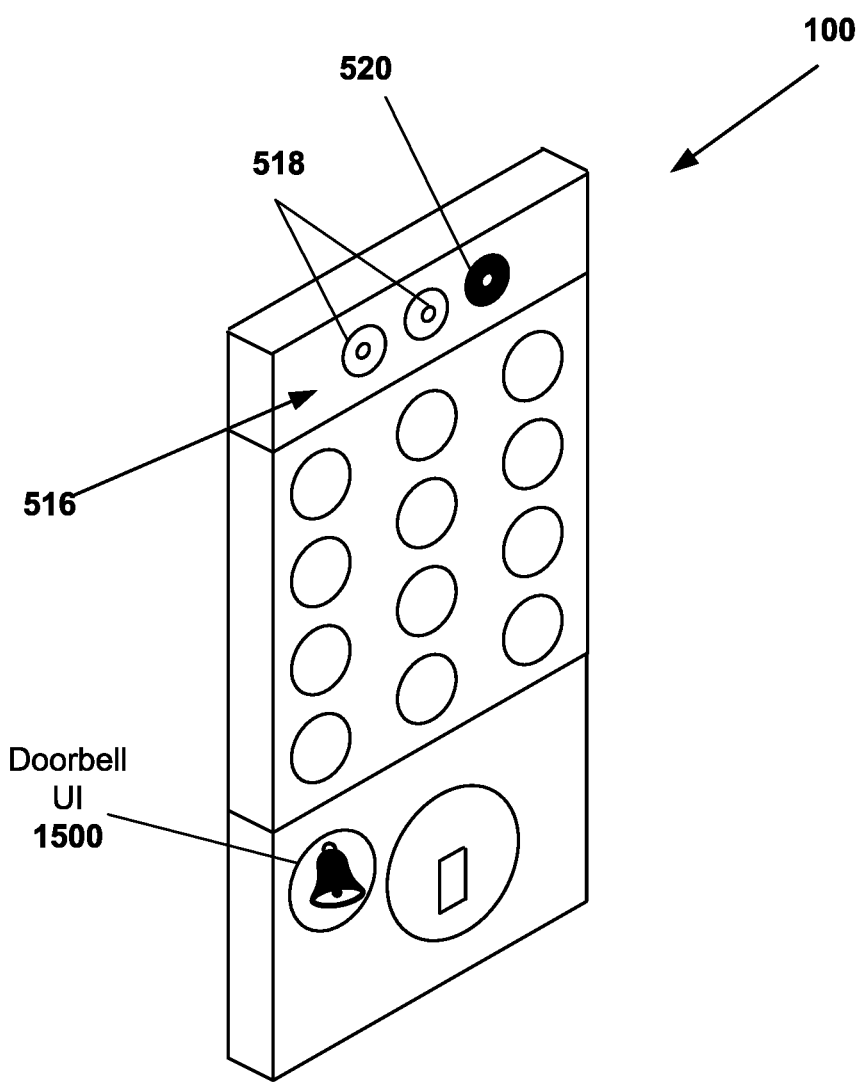
FIG. 15 illustrates an electronic lock with an integrated smart doorbell.

FIG. 15 illustrates an electronic lock 100 with an integrated smart doorbell. The example electronic lock shown includes an exterior facial authentication assembly 516 and a doorbell UI 1500.

The exterior facial authentication assembly 516 includes cameras 518 and a depth sensor 520. An example of the exterior facial authentication assembly 516 with the cameras 518 and the depth sensor 520 is illustrated and described in reference to FIG. 4.

In some embodiments, the electronic lock includes a camera and a doorbell UI 1500. For example, the doorbell UI 1500 can be a button. In some examples, a user selecting the doorbell acts as a wake-up mechanism for one or more components on the electronic lock. For example, when a user selects the doorbell UI 1500, the electronic lock turns on the exterior facial authentication assembly 516 components to perform facial authentication. In other examples, other automations occur in response to a user selecting the doorbell UI 1500. For example, an admin user may receive a notification that somebody selected the doorbell UI. In some examples, the admin user may receive a notification with an identification of the individual who selected the doorbell UI. In some examples, a user selecting the doorbell UI notifies the electronic lock that an event of interest is occurring at the lock. In response to this indication, the electronic lock may turn on the camera and start recording for a set period of time or until the electronic lock determines the event is no longer occurring. In one example, the electronic lock determines that an event is over when no motion or only motion below a threshold is detected at the exterior of the lock.

In some examples, when an admin user receives a notification that a guest has selected the doorbell UI, the admin user will receive a live stream of images from the lock on the admin mobile device. In some examples, the admin may communicate with the guest remotely via the mobile device and the electronic lock. In these examples, the electronic lock may include a speaker and microphone in the exterior assembly.

In some embodiments, the admin mobile device executes an application which operates with the doorbell UI and the electronic lock 100 to perform one or more of the features described above. The application can further operate to configure the settings, permissions, and automations. In some examples, the admin mobile device can be used as a secondary or backup form of authentication. For example, facial authentication can be performed on the admin mobile device when the battery power for the electronic lock is below a threshold.

Facial Authentication Models

In many embodiments, one or more models for performing facial authentication are stored on the electronic lock. In some examples, the one or more models are existing models which are downloaded on the electronic lock. In some embodiments, the model is trained on a specific user and over time as the user uses the lock. The model can be trained to perform facial authentication while the users features change or are obstructed by an object. For example, the model is trained to work with a user with different levels of facial hair or while the user is wearing a hat, glasses, or a mask. In some examples, a model is trained to identify specific users.

In example embodiments, a user provides training images (or calibration images) with an associated user name. In some of these embodiments, the user provides the training images with the electronic lock and/or a mobile device. Such trained images may be used, either by the electronic lock, mobile device, or a cloud system (e.g., a could service to train a facial authentication model which is later downloaded to the electronic lock). In some embodiments, it may be preferable to maintain all image data securely on the electronic lock. Therefore, in such embodiments, only training and authentication data may be captured or used in training at the electronic lock itself.

In some embodiments, the one or more facial authentication models configured for use with the electronic lock require relatively less processing power and storage space compared to traditional facial authentication models used on other devices (e.g., compared to models used on a mobile computing device).

Object Recognition

In some embodiments, the camera(s) and other exterior sensors used on the electronic lock are used to identify objects on the outside of a door. For example, packages, objects, humans, and pets may be detected and identified. In some examples, the object recognition features require a pretrained object to identify the one or more objects of interest.

In some examples, the electronic lock is able to detect packages placed in front of a door by a carrier. In some examples, the electronic lock may be configured to identify a package by scanning a package. For example, the camera on the electronic lock may be used to scan a barcode on the detected package. In some examples, the electronic lock decodes the barcode and provides a notification to the admin user, a carrier system, and/or a vendor system.

In some embodiments, the electronic lock may include instructions for automatically detecting the presence of a particular package carrier; for example, based on uniform color and type or based on recognition of the individual. In such instances, the electronic lock may provide audio or visual instructions to a recognized carrier to instruct the carrier to place the package in a specific location or hold the package so the camera is able to scan the barcode on the package. In still further embodiments, the electronic lock uses facial authentication to identify the carrier and notifies an admin user that the carrier is present at the door. For example, if the carrier is providing a package which requires the admin user to authorize leaving the package outside, the admin user can communicate via the electronic lock to provide such an authorization (e.g., using a microphone on the electronic lock). In still further examples, the carrier may have limited permissions to actuate the lock and leave the package inside the door. In some examples, the electronic lock will record and retain video while the package is detected outside the door. In some examples, this video is encrypted, compressed, and/or otherwise encoded and uploaded to the server. In some embodiments, an admin user is able to access the recordings through an application on their mobile device.

In some examples, when the electronic lock detects a package in front of the door, the electronic lock will increase the sensitivity for turning on sensors. For example, the electronic lock may wake-up the camera and record video based on detected motion being above a lower threshold when there is an identified package in front of the door.

Similarly, the duration of video retention may increase by a set amount of time. Accordingly, it may be possible for an electronic lock to capture a greater collection of events after a package has been left in front of the door, for example, to capturing any potential passerby who may take or tamper with the package.

In some examples, the electronic lock can detect different pets. In some examples, the pets may have a specific collar or a tag on the collar which the camera detects. In some examples, a notification is provided to an admin user when a pet is detected outside of a door.

Figure 16:
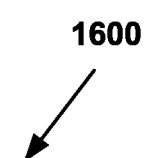
FIG. 16 illustrates an example method for adjusting lock settings in response to detecting an object.
Figure 16:
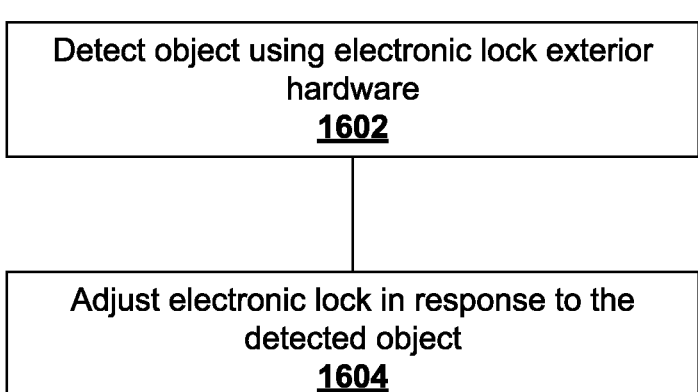

FIG. 16 illustrates an example method 1600 for adjusting lock settings in response to detecting an object. The method 1600 includes operations 1602 and 1604.

The operation 1602 detects an object using electronic exterior hardware. In some embodiments, the object is detected using one or more cameras. Other sensors can also be used individually or in combination with the one or more cameras.

The operation 1604 adjusts the lock in response to detecting an object. In some examples, adjusting the lock includes automatically actuating the lock based on the detected object. For example, if the lock detects a stranger at the door, the electronic lock may actuate the lock to move the bolt from an unlocked position to a locked position. In some embodiments, adjusting the electronic lock includes adjusting settings or configurations of the lock. In some examples, the electronic lock may start recording or adjust a video retention policy based on the object detected. Other examples of adjusting the electronic lock are discussed herein.

Video Retention Policies Based on User/Event Identification

In some embodiments, the camera(s) on the electronic lock are used to record video or capture images. In some examples, people, objects, pets, etc. are categorized, and the video or pictures captured of the scene are retained based on the category.

In one example, different video retention polices are applied to different users detected at the lock with facial authentications. For example, no video may be retained for an admin user, 1 minute of video for a guest user, and 5 minutes for a stranger. In some examples, a model may detect characteristics that indicate a child is in front of the door and retain a set amount of time for a child and another amount of time for an adult. Similar retention policies can be applied to detected movements. In one example, when the electronic lock detects a package or other item of interest in front of the door, the electronic lock will retain video for a set amount of time or until the item is moved.

In some examples, the electronic lock includes an application which classifies users into different categories. Examples of categories include: admin user, resident user, guest user, adult user, child user, carrier user, etc. Each of the different categories can include different settings for tracking and data retention. For example, the video retention for strangers can be a set amount of time (e.g., 30 seconds), for a child user, a different set time (e.g., 2 minutes) and an admin user may not have any video saved. The electronic lock may encrypt, encode, and otherwise compress the video before uploading the video to a server. In some examples, a user computing device includes an application with a UI which allows the user to configure the retention video settings and view saved recordings.

Figure 17:
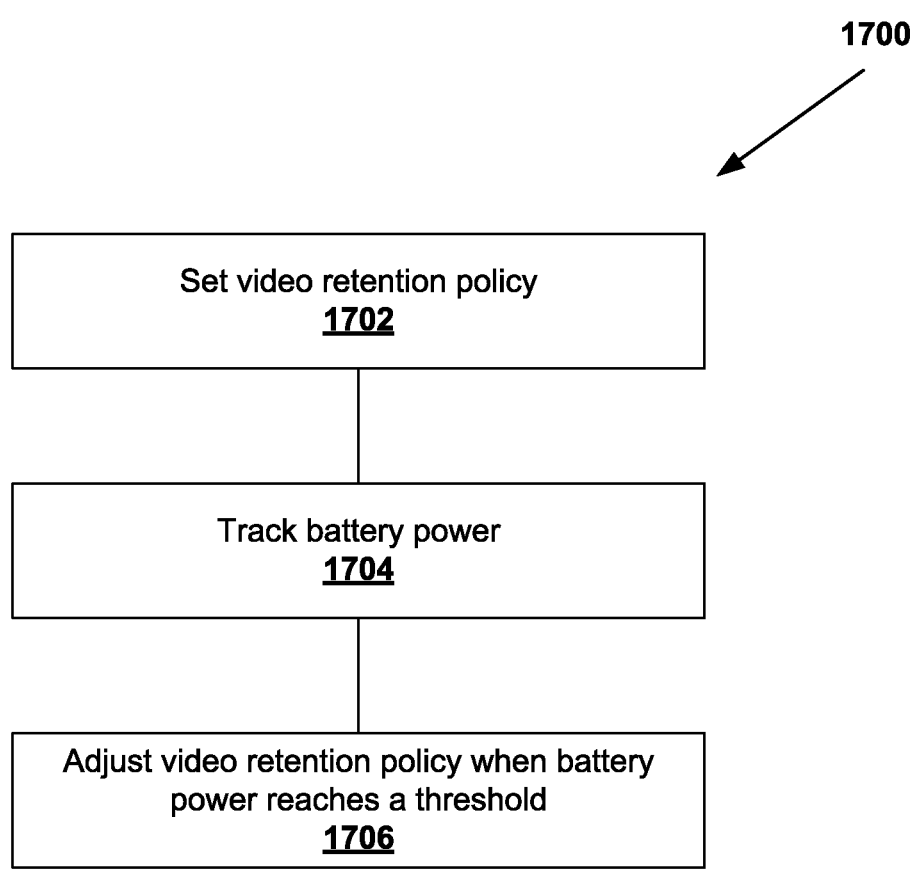
FIG. 17 illustrates an example method for adjusting video retention policies to conserve power.

FIG. 17 illustrates an example method 1700 for adjusting video retention policies to conserve power. The method 1700 includes the operations 1702, 1704, and 1706.

The operation 1702 sets a video retention policy. In some embodiments, the video retention policy is based on different categories of detected users. For example, an owner of the electronic lockset may have no video recorded or saved, a guest user may have 30 seconds of video recorded/saved, a child may have 1 minute of video recorded/saved, and a stranger may have 5 minutes recorded/saved. In many embodiments, a user configures the video retention policies to desired times for each category of users. In some embodiments, video retention policies may be applied to specific users. Additionally, in some embodiments, video retention policies are applied to detected objects. For example, video is recorded and saved for a specific amount of time when a package is left outside the door. In some examples, the lock performs video compression and encryption before uploading the video to a server or other computing device.

The operation 1704 tracks the battery power on a lock. In some embodiments, the operation 1704 includes calculating an estimated percentage of battery power or a time of remaining battery power. The operation 1704 may also track how much power various components use while activated.

The operation 1706 adjusts at least one video retention policy when the battery power for the electronic lock drops below a threshold. In some embodiments, adjusting the video retention policy includes reducing the amount of video recorded, saved, and/or uploaded. For example, if the power for the lock drops below a threshold, the electronic lock may stop recording video when a known guest user is detected, reduce the time of recording for a child user, while maintaining the video retention time for a stranger. In some embodiments, a user must select a setting which allows the lock to reduce the video retained. The user can also configure the adjustments in the video retention policy. In some embodiments, there can be several different thresholds with different adjustments. For example, a first threshold may limit the length of video retained and when the power goes below a second (lower) threshold, the electronic lock may determine to stop recording video.

Backup Authentication and Multiple Authentication Features with Facial Authentication In some examples, facial authentication is used as a backup authentication method. For example, the electronic lock may have a primary authentication method which typically operates and facial authentication is only used if the primary authentication is unavailable. In one example, the primary authentication method may include sharing an encrypted certificate on a mobile device with the electronic lock using Bluetooth® or (BLE). In this example, this form of authentication is not available if the user forgets their phone or if the phone runs out of battery. In these situations, facial authentication can be used as a backup.

In other examples, facial authentication is used as a second form of authentication. For example, in some embodiments, to actuate a lock, multiple forms of authentication must be provided. For example, facial authentication and a passcode must be provided before a user can actuate the lock. In some examples, an admin user can select any number or combination of authentication methods from a menu of options including facial authentication.

Component Wake-Up Features

In some embodiments, one or more components of the electronic lock are switched off to preserve power. In some examples, the camera and sensors used for facial authentication are turned off until the electronic lock receives an indication that these components should be turned on. In some examples, the component wake-up features are used to preserve battery power. In some of these examples, the wake-up features operate in a manner that a user would not notice that components are turned off. For example, the components are woken up before the user approaches the door in range to actuate the lock.

In some examples, the server 114 receives global positioning (GPS) data from an admin user's mobile phone. The GPS data is used to determine when the admin user is within a certain distance of the lock (e.g., determine where a user is in relation to a geofence). When a user is within a set distance, the server 114 sends a message to the electronic lock instructing the lock to turn on specific components, such as the facial authentication components. In other examples, the lock may use a camera as a motion sensor and turn on components such as Bluetooth components in response to detecting motion in front of the lock. In alternative embodiments, the Bluetooth components may always be on and when a phone connects, or pairing the electronic lock over Bluetooth, the electronic lock turns on the facial authentication components. Other technologies/sensors which can be used to determine when to turn on the facial authentication components include ultra-wide band sensors, passive infrared (PIR) sensors, motion detector cameras/sensors, and ultrasound sensors.

Some embodiments include an authentication-in-stride feature. The authentication-in-stride feature operates to actuate a lock automatically as an authorized user approaches the electronic lock. In one example, a sensor detects motion approaching the lock, which turns on the facial authentication components, which captures facial data of the user walking to the door. The electronic lock performs facial authentication using the facial data as the user walks and actuates the lock as the user approaches the door. In some examples, the authentication-in-stride feature uses facial authentication to verify a user. In other examples, Bluetooth is used to exchange certificates.

Figure 18:
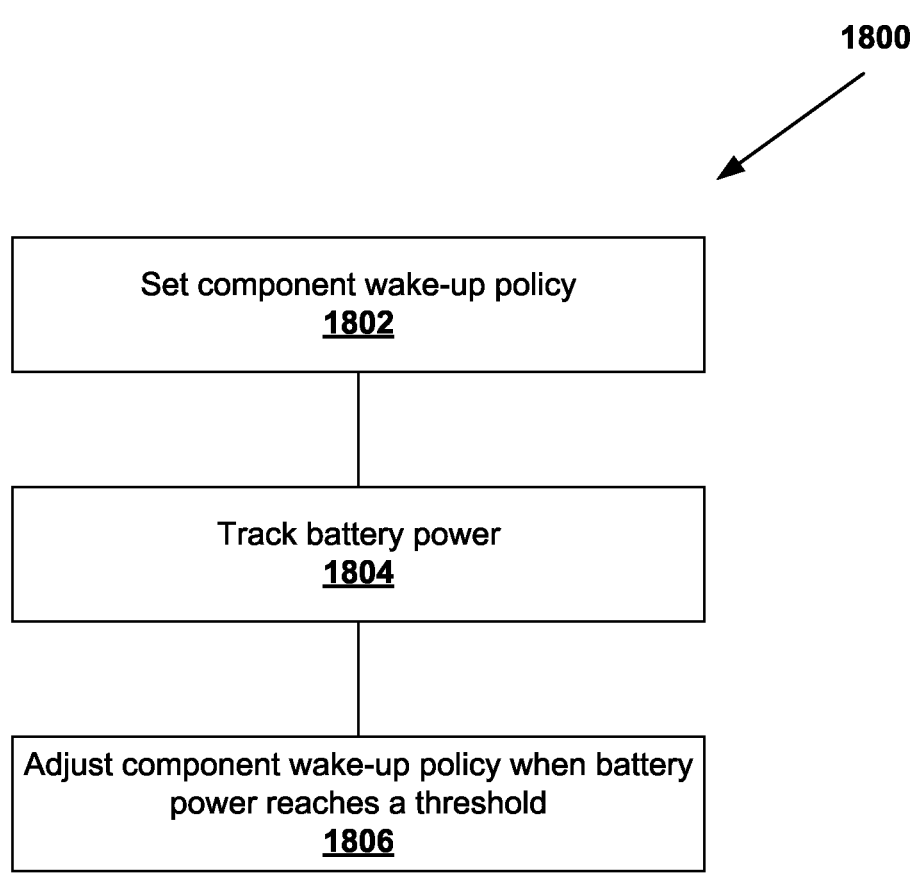
FIG. 18 illustrates an example method for adjusting component wake-up policies to conserve battery power.

FIG. 18 illustrates an example method 1800 for adjusting component wake-up policies to conserve battery power. The method 1800 includes the operation 1802, 1804, and 1806.

The operation 1802 sets a component wake-up policy. In some embodiments, the electronic lock receives signals from various sensors individually or in combination which indicate that one or more components of the electronic lock should be turned on. In some embodiments, the electronic lock may have settings for determining the sensitivity for turning on one or more components. For example, the electronic lock may have a threshold of movement which is detected before turning on a component. In some examples, this setting is configurable by a user. In other settings, the electronic lock is trained or calibrated to determine the correct sensitivity level for the specific setting.

The operation 1804 tracks the electronic lock battery power. In some embodiments, the operation 1804 includes calculating an estimated percentage of battery power or a time of remaining battery power. The operation 1804 may also track how much power various components used when activated.

The operation 1806 adjusts the component wake-up policy when the battery power drops below a threshold. In some embodiments, the adjustment includes decreasing the sensitivity (e.g., requiring more stimulus) for waking up one or more components. In some embodiments, adjusting the component wake-up policy may include only activating a subset of components which would normally be activated under the given stimulus.

Facial Recognition Processing and Output

Figure 19:
FIG. 19 illustrates an example facial authentication output as determined from a facial authentication process at an electronic lock.
Figure 19:
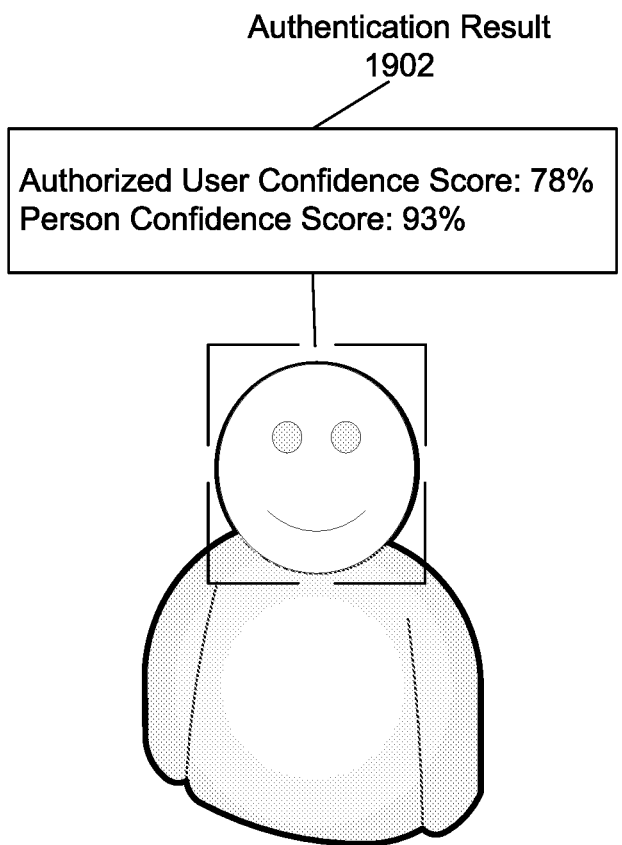

FIG. 19 illustrates an example facial authentication output 1900 as determined from a facial authentication process at an electronic lock. In some embodiments, the facial authentication output includes an authentication result 1902. In some embodiments, the authentication result 1902 includes a first confidence score corresponding to a determined confidence that an authorized user is detected. In some embodiments, the authentication result further includes a second confidence score corresponding to liveness confidence (e.g., confidence that a real face is detected, instead of, for example, an image of face or other object placed in attempt to deceive the facial authentication system). In some embodiments, each of these confidence scores are compared to a threshold. In some embodiments, the thresholds are individually adjustable (e.g., by an authorized user and/or the electronic lock manufacturer). In some embodiments, each confidence score corresponds to the same value which is adjustable. In other embodiments, the confidence scores are fixed.

In one example method, the facial recognition software determines a first confidence score that a detected face is a face of a user authorized to access the electronic lock. This confidence score is compared to a first threshold. If the confidence score is below the first threshold, the facial authentication fails. If the confidence score is above the first threshold, the facial authentication process continues to a liveness detection step. The liveness detection step determines a second confidence score that the detected face is a real face of the detected user. The second confidence score is compared to a second threshold. If the second confidence score is above the second threshold, the facial authentication passes and the user can access the electronic lock. If the second confidence score is below the second threshold, then the facial authentication fails. In some embodiments, when the facial authentication fails, an authentication fails result is output and the lock is not actuatable without receiving a valid credential (e.g., with a second successful facial authentication attempt, another valid biometric (finger print), a valid passcode, a valid wireless message for a user device, etc.). In some embodiments, when the facial authentication passes, an authentication passes result is output and the lock can be actuated by the detected user. In some embodiments, the liveness detection is performed before the authorized user detection. In other embodiments, the liveness detection and the authorized user detection are performed simultaneously.

Enrollment at User Device

Figure 20:
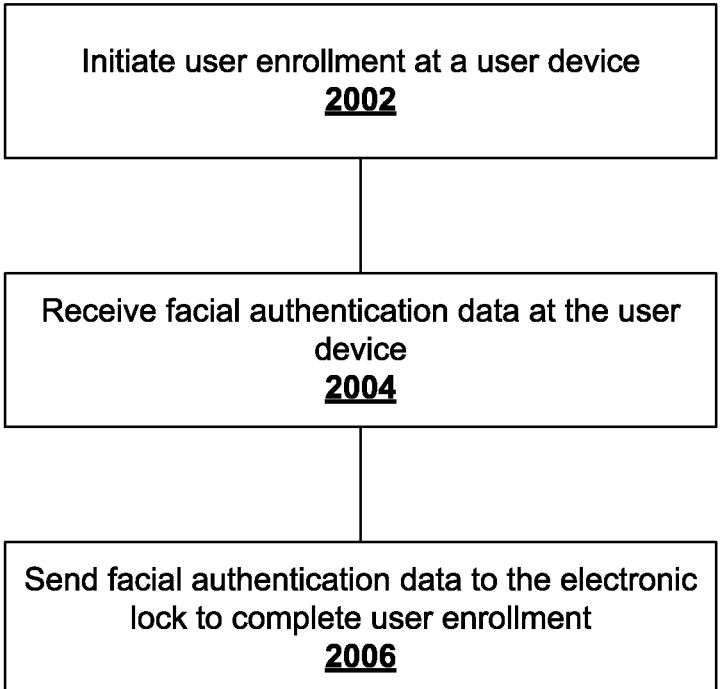
FIG. 20 illustrates an example method for enrolling a new user with the electronic lock at a user computing device.

FIG. 20 illustrates an example method 2000 for enrolling a new user with the electronic lock at a user computing device. The method 2000 includes operations 2002, 2004, and 2006.

The operation 2002 initiates user enrollment at a user device. In some embodiments, a user receives a link (e.g., a URL provided in an electronic message or by scanning a code, such as a QR code or other machine readable code). In some embodiments, a user initiates user enrollment at the user device via an application associated with the electronic lock.

The operation 2004 receives facial authentication data at the user device. In some embodiments, the facial authentication data incudes an image of the user. In some embodiments, the facial authentication data includes other biometric data (e.g., detected 3D facial data). In some embodiments, a user is requested to take an image of their face via a camera on the user device. In some embodiments, a user is requested to upload an image of a user to be enrolled at the electronic lock. In some embodiments, an admin user can upload images of other users to enroll the other users with the electronic lock. In some embodiments, the facial authentication data is linked with a user ID.

The operation 2006 sends the facial authentication data to the electronic lock to complete the user enrollment. In some embodiments, the facial authentication data is sent over a secure connection. The facial authentication data may be encrypted or otherwise secured. As discussed above, in some embodiments, the facial authentication data only includes an image of the enrolling user's face. In some embodiments, the facial authentication data is received at the electronic lock and the enrollment of the user is complete. In other embodiments, the enrollment enters a pending state which is completed after the user who is requesting enrollment first interacts with the electronic lock. For example, the lock may have enough data to initially authenticate the user but collects additional data (e.g., based on the angle captured from the specific angle and position of lock as installed on the door and/or 3D data from one or more sensors located on the lock) before completing enrollment of the user.

Tracking Occupancy Feature

In some examples, the electronic lock includes a tracking occupancy feature. For example, the electronic lock may track each user that actuates the lock using facial authentication. Each user tracked can be stored in a list of current occupants. The list of current occupants may be accessed by an admin user on a mobile computing device via the server. In some examples, the list of current occupants is stored on the electronic lock, the server, or both. In some examples, the lock is further configured to detect users leaving the secured space. For example, the electronic lock may include a model which is able to identify a user leaving or entering the secured space. In some examples, the model uses facial authentication technology. The model may further be able to detect an individual based on detected stride recorded by the camera(s) on the electronic lock or based on other detected features. For example, in instances where more than one user may enter or exit the secured space upon authentication of one authorized user, the electronic lock may be configured to perform object (person) detection to determine a number of moving objects (people) passing in front of the camera and use that number of objects as a proxy for the current occupancy.

In some embodiments, the tracking occupancy feature uses a separate camera from the lock. For example, this feature can operate on a security camera or a camera on a smart doorbell. This feature may also be implemented in a smart door system.

In some embodiments, the electronic lock may perform an automation in response to the occupancy of a room being above or below one or more thresholds. For example, the electronic lock may automatically send a notification to a host when the occupancy exceeds a threshold.

List of Trusted Users

In some embodiments, the electronic lock stores a list of trusted users. For example, an admin user can upload pictures for trusted users. When one of the users on the trusted list of users visits the lock, the lock can initiate enrollment of the trusted user. In some examples, a second level of authentication is used before enrolling a trusted user. For example, the trusted user may need to enter an enrollment code. In other examples, the admin user is notified when a trusted user is at the lock and the admin user must select a confirmation button before the trusted user is allowed to enroll at the lock.

In the typical example, the list of trusted users is stored on the electronic lock. In some examples, an admin mobile device operates an application which allows an admin user to create, modify, and configure the list of trusted users.

In some embodiments, the list of trusted users includes a list for tracking a list of known but untrusted people. This list can also be stored at the electronic lock or may be stored at a remote or third party server. For example, a list of America's Most Wanted may be stored at the lock. Different automations may occur at the electronic lock when an untrusted person is detected. For example, the electronic lock may automatically record and retain video, or provide a notification to the admin user or the police. In some examples, to avoid false positives, a notification is provided to an admin user who must take an action before the police are notified. In further examples, such a feature may be disabled or can be enabled only on some devices. In many embodiments, this feature requires various checks to avoid false positives.

In some embodiments, when a trusted or untrusted person is detected, the electronic lock may override one of the policies (e.g., a component wake-up policy, video retention policy etc.). For example, if an untrusted person is detected, the lock may automatically wake up the camera and record and save video even if the electronic lock is running low on battery power.

Machine Readable Code Actuation

In some embodiments, the camera(s) on the electronic lock operate to scan a machine readable code which, if properly validated, allows a user to actuate the lock. An example of a machine readable code is a QR code.

In one example, an admin user invites a guest user to access the electronic lock. To invite the guest user, the admin user mobile device creates a one-time passcode which is encoded into a machine readable code. The one-time passcode is sent to the guest user mobile device via a server. The guest user then opens the machine readable code on a guest user mobile device and places the screen with the machine readable code visible in view of the camera(s) on the electronic lock. The electronic lock decodes the scanned machine readable code and verifies the one-time passcode before actuating the lock, or allowing the guest user to actuate the lock. In other examples, the machine readable code may be used more than one time.

In some examples, the electronic lock will enroll the guest user after verifying the machine readable code. In some examples, the machine readable code is linked with scheduled times at which a user with the code is able to access the electronic lock. In some of these examples, enrolling the guest user includes scanning the guest user's face to create a facial authentication profile.

Direct Sunlight Protection

In some examples, the electronic lock includes additional components for blocking sunlight from interfering with the camera(s) or other sensors. For example, the electronic lock may include a shield or visor to protect the camera(s). In some examples, the cameras and sensors are placed on the lock to protect these components from direct sunlight.

Facial Authentication on Mobile Device

In some examples, the facial authentication process for actuating an electronic lock is performed on a mobile computing device for a user. In these examples, successful verification of a user sends a message (directly, e.g., with Bluetooth®, over a local network, or by sending a command to a remote server which is able to communicate with the electronic lock) to the electronic lock to actuate the lock. In some examples, the facial authentication process is performed on a mobile device as a backup when the user is not able to use the facial authentication on the electronic lock.

For example, if the camera on the lock is unable to capture an image without glare from the sun or if the electronic lock shuts down the facial authentication components because the electronic lock is running low on power. In some embodiments, the facial authentication process is performed as a second form of verification to another form of verification provided at the electronic lock. In some examples, the calibration or creating of the facial authentication profile is done using a mobile device, the profile being provided to the electronic lock. This feature could also be used with locks which do not have facial authentication capabilities.

Multiple Faces Support

In some embodiments, the electronic lock includes support for detecting multiple faces. In some embodiments, when multiple faces are detected, the electronic lock determines if at least one detected face matches a stored facial authentication profile and allows access to actuate the lock if one of the user faces matches an enrolled facial authentication profile. In some embodiments, each detected face is stored as a profile. In some embodiments, each face must either match an enrolled facial authentication profile or, if the user does not yet have a facial authentication profile, the electronic lock will ask the user to enroll. In other embodiments, a temporary facial authentication profile is stored for each unknown face. These facial authentication profiles can be used for the features above, including tracking occupancy for locked space. In some examples, the temporary facial authentication profiles are stored for a predetermined period of time. In other examples, the temporary facial authentication profile is kept until an event occurs which indicates the facial authentication profile should be removed. For example, the temporary user leaving the space or an admin user providing inputs to reset the temporary facial authentication profiles. In some embodiments, the electronic lock tracks the number of unknown or temporary detected faces.

Exporting User Profiles to a New Lock

In some examples, facial authentication profiles from one lock can be exported to a different lock. For example, if a user buys a second lock for a different entrance, the facial authentication profiles from the first lock can be exported to the new lock. In another example, if a user replaces a lock, the old lock can export the facial authentication profiles to the new lock. In these examples, after the facial authentication profiles are exported, the old lock deletes the facial authentication profiles so the user can securely dispose of the old lock.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An electronic lock comprising:

an interior subassembly including a manual turnpiece, a control circuit, and a motor actuatable by the control circuit;

an exterior subassembly including a facial authentication circuit operatively connected to the control circuit; and a latch operatively connected to the interior subassembly, the latch being engageable by the manual turnpiece or the motor to move the electronic lock between a locked state and an unlocked state;

wherein the facial authentication circuit includes at least one camera and is configured to generate an authentication signal to the control circuit, and wherein, at least in part in response to the authentication signal, the control circuit is configured to actuate the motor to move the electronic lock between the locked state and the unlocked state; and wherein the facial authentication circuit generates the authentication signal based on a comparison, by a locally stored facial recognition model, between facial authentication data captured by the at least one camera and a locally stored facial authentication profile associated with an enrolled user, the facial recognition model being trained remotely from the electronic lock and received in a memory of the electronic lock from a server remote from the electronic lock.

2. The electronic lock of claim 1, further comprising a keypad on the exterior subassembly.

3. The electronic lock of claim 1, further comprising a wireless interface communicatively connected to the control circuit.

4. The electronic lock of claim 3, further comprising a mobile device wirelessly connected to the wireless interface, wherein communication between the mobile device and the wireless interface provides a first method of authentication and the facial authentication circuit provides a second method of authentication for a user.

5. The electronic lock of claim 4, wherein the control circuit is configured to actuate the motor in response to both the first method and second method of authentication.

6. The electronic lock of claim 1, wherein the facial recognition model is further trained locally on the electronic lock after being received from the server.

7. The electronic lock of claim 6, wherein the facial recognition model is configured to detect one or more of:

untrusted users;

trusted users based on image data received from a remote mobile device;

trusted users based on received image data;

package carriers;

packages; or pets.

8. The electronic lock of claim 1, further comprising a battery, wherein, in response to a battery capacity falling below a threshold, one or more features of the electronic lock are disabled.

9. The electronic lock of claim 8, further comprising a backup battery, wherein, in response to the battery capacity falling below the threshold, using the backup battery to power one or more circuits within the electronic lock.

10. The electronic lock of claim 1, wherein the electronic lock is connected to an external power source.

11. The electronic lock of claim 1, wherein the facial authentication circuit is further configured to detect a presence of a package, and wherein the electronic lock is configured to change one or more recording settings upon detecting the presence of the package.

12. The electronic lock of claim 1, wherein one or more recording settings includes a motion sensitivity or a duration of recording response to detecting motion.

13. The electronic lock of claim 1, wherein the facial authentication circuit is further configured to detect a presence of a plurality of faces.

14. The electronic lock of claim 13, wherein the authentication signal is generated in response to at least one face of the plurality of faces being enrolled for the electronic lock.

15. The electronic lock of claim 13, wherein the authentication signal is generated in response to each of the plurality of faces being enrolled for the electronic lock.

16. The electronic lock of claim 1, wherein the electronic lock further includes a memory which stores the facial authentication profile.

17. The electronic lock of claim 16, wherein the facial authentication profile can be exported to a second electronic lock.

18. The electronic lock of claim 1, wherein the facial recognition model includes a neural network.

19. The electronic lock of claim 1, wherein the facial recognition model is trained using a plurality of training images.

20. A method for actuating an electronic lock, the method comprising:

activating a facial authentication circuit of an electronic lock, the facial authentication circuit including at least one camera;

detecting, via the at least one camera, a face;

verifying, by the facial authentication circuit, the face with the facial authentication circuit by comparing, with a locally stored facial recognition model, the face with a locally stored facial authentication profile associated with an enrolled user, wherein the facial recognition model is trained remotely from electronic lock and received in a memory of the electronic lock from a server remote from the electronic lock;

generating, by the facial authentication circuit, an authentication signal; and actuating a motor of the electronic lock to move the electronic lock between a locked state and an unlocked state based at least in part on the authentication signal.

21. The method of claim 20, wherein the facial authentication circuit includes a memory storing the facial recognition model.

22. An electronic lock comprising:

a control circuit;

a motor actuatable by the control circuit;

a facial authentication circuit operatively connected to the control circuit, the facial authentication circuit including at least one camera and a memory storing a facial recognition model, wherein the facial recognition model is trained remotely from the electronic lock and received in the memory of the facial authentication circuit from a server remote from the electronic lock;

wherein the facial authentication circuit is configured to generate an authentication signal to the control circuit based on a comparison, by the facial recognition model, between facial authentication data captured by the at least one camera and a locally stored authentication profile associated with an enrolled user; and wherein, at least in part in response to the authentication signal, the control circuit is configured to actuate a motor to move the electronic lock between a locked state and an unlocked state.

* * * * *